(12) United States Patent
Nakanishi et al.

(10) Patent No.: US 7,080,259 B1
(45) Date of Patent: Jul. 18, 2006

(54) ELECTRONIC INFORMATION BACKUP SYSTEM

(75) Inventors: Yoshiaki Nakanishi, Tokyo (JP); Hisashi Takayama, Tokyo (JP); Tetsuo Matsuse, Suita (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 755 days.

(21) Appl. No.: 09/807,295

(22) PCT Filed: Aug. 14, 2000

(86) PCT No.: PCT/JP00/05439

§ 371 (c)(1),
(2), (4) Date: Jul. 13, 2001

(87) PCT Pub. No.: WO01/13293

PCT Pub. Date: Feb. 22, 2001

(30) Foreign Application Priority Data

Aug. 12, 1999 (JP) ................................. 11-228154

(51) Int. Cl.
*H04L 9/32* (2006.01)
*H04L 9/00* (2006.01)

(52) U.S. Cl. ...................... 713/193; 713/168; 380/277; 380/44

(58) Field of Classification Search ................ 713/155, 713/156, 189, 192–194, 168; 380/382, 282, 380/277, 44; 705/41; 726/9
See application file for complete search history.

(56) References Cited

U.S. PATENT DOCUMENTS 5,191,193 A * 3/1993 Le Roux .................... 235/379

5,878,138 A * 3/1999 Yacobi ........................ 705/69

(Continued)

FOREIGN PATENT DOCUMENTS

CN 1189907 A 8/1998

(Continued)

OTHER PUBLICATIONS

Storey, Veda C et al., "A Conceptual Investigation of the E-Commerce Industry", in Communications of the ACM, vol. 43, No. 7, Jul. 2000, pp. 117-123. (See the last sentence of the first section).

*Primary Examiner*—Hosuk Song
*Assistant Examiner*—Linh L D Son
(74) *Attorney, Agent, or Firm*—Browdy and Neimark, PLLC

(57) ABSTRACT

An electronic information backup system for safely back up electronic value information about electronic money and electronic ticket through communication in a server so as to exclude unauthorized actions when backup and restoring are performed and for restoring the electronic value information from the backup in case of emergency such as loss of key information. In this system, electronic value information is encrypted, the encrypted electronic value information is registered in an electronic safe server, and the user receives the registration, presents the registration to the server to receive the encrypted electronic value information, and decrypts the electronic value information with decrypting key data. The decrypting key can be kept in another server. The electronic value information and the decrypting key can be kept separately in different servers. It is possible to keep the sequence of number of the cryptogram to serve as the basic the decrypting key in the server, and to generate a decrypting key according to a decrypting key generation algorithm on the terminal side. In case of loss of the decrypting key, the possessor certificate information is verified and then the user can receive the decrypting key from the server.

21 Claims, 19 Drawing Sheets

U.S. PATENT DOCUMENTS

| | | | |
|---|---|---|---|
| 5,937,066 A * | 8/1999 | Gennaro et al. | 380/286 |
| 5,970,475 A * | 10/1999 | Barnes et al. | 705/27 |
| 5,982,293 A | 11/1999 | Everett et al. | |
| 6,118,874 A * | 9/2000 | Okamoto et al. | 380/282 |
| 6,220,510 B1 * | 4/2001 | Everett et al. | 235/380 |
| 6,263,313 B1 * | 7/2001 | Milsted et al. | 705/1 |
| 6,282,653 B1 * | 8/2001 | Berstis et al. | 713/200 |
| 6,317,832 B1 * | 11/2001 | Everett et al. | 713/172 |
| 6,328,217 B1 * | 12/2001 | Everett et al. | 235/492 |
| 6,357,665 B1 * | 3/2002 | Peachman et al. | 235/492 |
| 6,567,915 B1 * | 5/2003 | Guthery | 713/168 |
| 6,738,899 B1 * | 5/2004 | Cordery | 713/156 |
| 2002/0004783 A1 * | 1/2002 | Paltenghe et al. | 705/41 |

FOREIGN PATENT DOCUMENTS

| | | |
|---|---|---|
| EP | 0 437 616 A1 | 7/1991 |
| EP | 0 696 021 B1 | 2/1996 |
| EP | 000803828 A1 * | 10/1997 |
| EP | 0 869 635 A2 | 10/1998 |
| EP | 0 917 119 A2 | 5/1999 |
| EP | 0 949 595 A2 | 10/1999 |
| JP | 06-039568 A | 2/1994 |
| JP | 09-160990 | 6/1997 |
| WO | WO 96/05673 A1 | 8/1995 |
| WO | WO 97/02539 | 1/1997 |
| WO | WO 98/35472 | 8/1998 |

* cited by examiner

FIG. 2

ELECTRONIC VALUE INFORMATION 201

| INFORMATION CLASS | MOVIE TICKET |
|---|---|
| NAME | MOVIE TITLE |
| UNIT PRICE | ¥ A |
| Q'TY | B |
| TOTAL AMOUNT | ¥ A × B |
| PLACE | THEATER NAME |
| TERM OF VALIDITY | C ~ D |
| REMARKS | ...... |

(a)

DIGEST 302

| INFORMATION CLASS | MOVIE TICKET |
|---|---|
| NAME | MOVIE TITLE |
| Q'TY | B |
| TERM OF VALIDITY | C ~ D |
| PLACE | THEATER NAME |

(b)

301 REGISTRATION CERTIFICATE

| DIGEST 302 | HASH VALUE X1 | COUNTER VALUE Y1 |

(c)

A: SIGN TO INDICATE THE POINTER TO THE ELECTRONIC VALUE INFORMATION
B: SIGN TO INDICATE THE POINTER TO THE REGISTRATION CERTIFICATE

→ ACTUAL FORMAT OF DATA INDICATED WITH THE POINTER

FIG. 6

REGISTRATION ELECTRONIC
VALUE INFORMATION 203

| INFORMATION CLASS | MOVIE TICKET |
|---|---|
| NAME | MOVIE TITLE |
| Q'TY | B |
| PLACE | THEATER NAME |
| TERM OF VALIDITY | C ~ D |

DIGEST 302

ENCRYPTION ELECTRONIC
VALUE INFORMATION 202

SLGNATURE 303

(a)

REGISTRATION
CERTIFICATE 304

| DIGEST 302 | HASH VALUE X2 | COUNTER VALUE Y2 |

(b)

FIG. 7
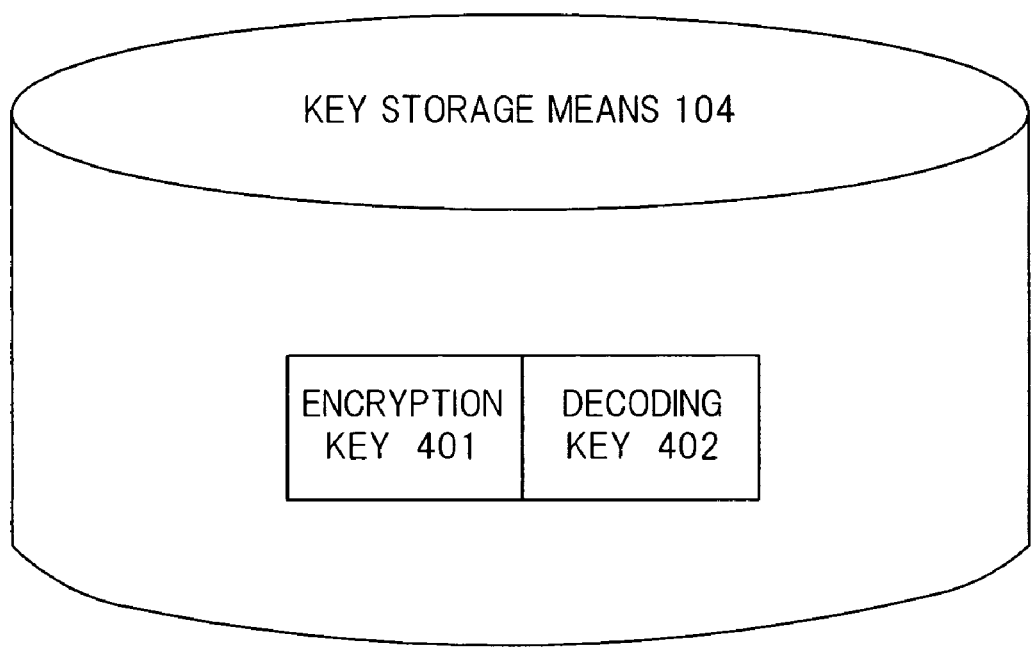
FIG. 8
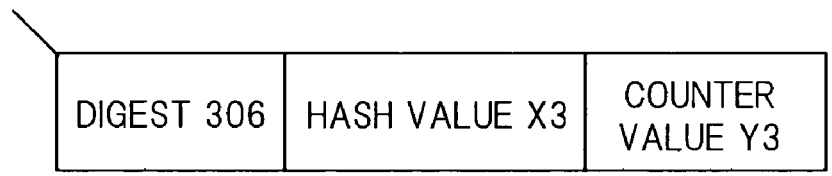
(a)
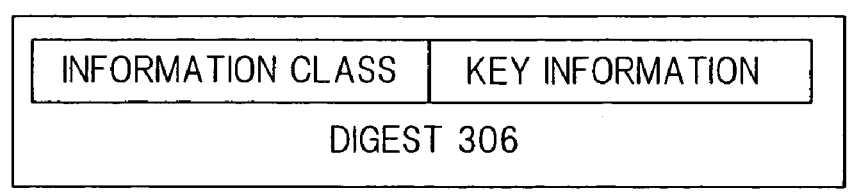
(b)

FIG. 9

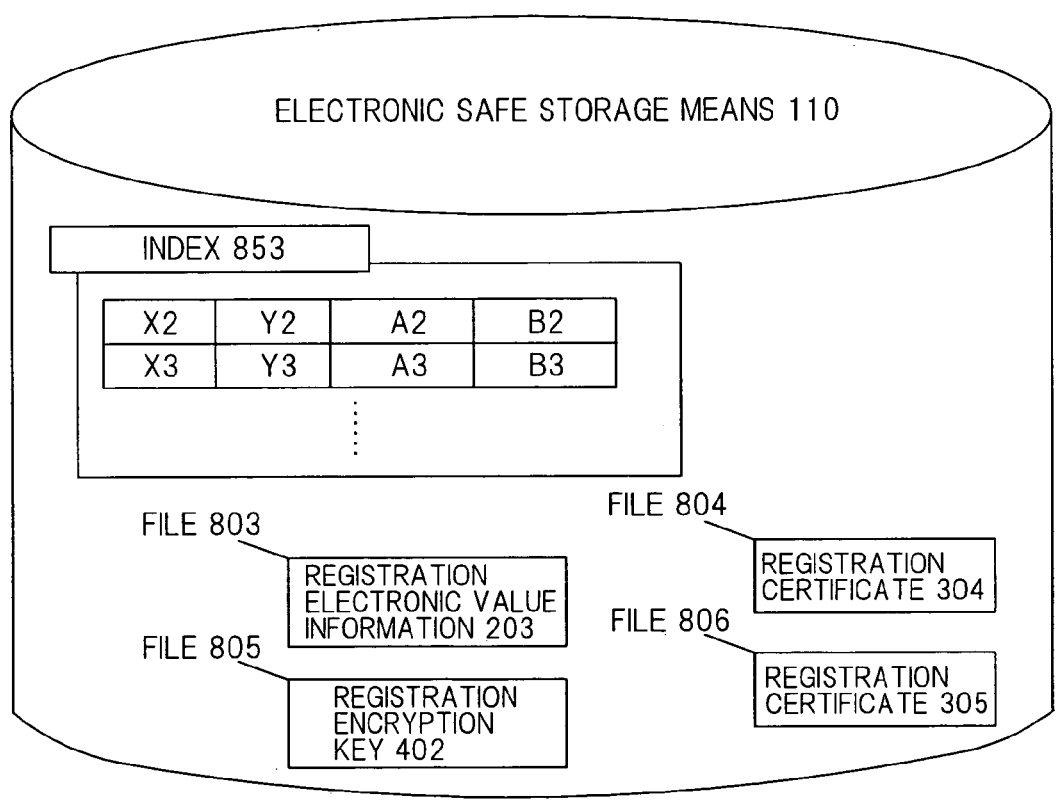

A2: PATH INFORMATION OF FILE 803
B2: PATH INFORMATION OF FILE 804
A3: PATH INFORMATION OF FILE 805
B3: PATH INFORMATION OF FILE 806

X2: HASH VALUE OF STRUCTURE ELEMENT OF REGISTRATION CERTIFICATE 304
Y2: COUNTER VALUE OF STRUCTURAL ELEMENT OF REGISTRATION CERTIFICATE 304
X3: HASH VALUE OF STRUCTURAL ELEMENT OF REGISTRATION VALUE 305
Y3: COUNTER VALUE OF STRUCTURAL ELEMENT OF REGISTRATION CERTIFICATE 305

FIG. 19

| INFORMATION CLASS |
|---|
| NAME |
| UNIT PRICE |
| Q'TY |
| TOTAL AMOUNT |
| PLACE |
| TERM OF VALIDITY |
| REMAINING AMOUNT |

| MOVIE TICKET |
|---|
| A |
| ¥1600 |
| 1 |
| ¥1600 |
| B |
| APRIL 1, 2000 TO MAY 31, 2000 |
| ¥0 |

| CONCERT TICKET |
|---|
| C |
| ¥4500 |
| 2 |
| ¥9000 |
| D |
| APRIL 29, 2000 TO APRIL 29, 2000 |
| ¥0 |

| PRE-PAID CARD |
|---|
| E |
| ¥1000 |
| 1 |
| ¥1000 |
| F |
| NO LIMITATION OF PERIOD |
| ¥800 |

| MOVIE TICKET |
|---|
| G |
| ¥1600 |
| 2 |
| ¥3200 |
| H |
| MAY 1, 2000 TO JUNE 30, 2000 |
| ¥0 |

FIG. 20

| MOVIE TICKET |
|---|
| A |
| ¥1600 |
| 1 |
| ¥1600 |
| B |
| APRIL 1, 2000 TO MAY 31, 2000 |
| ¥0 |

| MOVIE TICKET |
|---|
| G |
| ¥1600 |
| 2 |
| ¥3200 |
| H |
| MAY 1, 2000 TO JUNE 30, 2000 |
| ¥0 |

(a)

| PRE-PAID CARD |
|---|
| E |
| ¥1000 |
| 1 |
| ¥1000 |
| F |
| NO LIMITATION OF PERIOD |
| ¥800 |

| MOVIE TICKET |
|---|
| G |
| ¥1600 |
| 2 |
| ¥3200 |
| H |
| MAY 1, 2000 TO JUNE 30, 2000 |
| ¥0 |

(b)

ELECTRONIC INFORMATION BACKUP SYSTEM

REFERENCE TO RELATED APPLICATIONS

The present application is the national stage under 35 U.S.C. §371 of international application PCT/JP00/05439, filed Aug. 14, 2000 which designated the United States, and which application was not published in the English language.

TECHNICAL FIELD

The present invention relates to a backup system utilizing computers and information communication and more specifically to a backup and recovery system for electronic value information such as electronic cash and electronic ticket.

BACKGROUND ART

The technology to express and utilize money or information having monetary value such as electronic money or electronic ticket in the electronic format has recently grown up as the ordinary technology. Electronically expressed value information such as electronic cash or electronic ticket will be called later as electronic value information.

As a method of expression, an electronic value information is set on a server installed in distant area and an owner of this electronic value information has only an authentication information and makes communication with the server at the time of application. This method however has a problem that safe transaction can be realized by assuring sufficient safety in the authentication but electronic value information can be used only in the condition that the system may be connected to the network and also has a problem that inquiry to the network is generated for each application and thereby it is difficult to adapt this method to the condition that requires high speed response.

Therefore, in view of utilizing the electronic value information even under the condition that is independent of the network, there has been proposed a technique for holding electronic value information itself on devices such as IC card, hand-held telephone set and hand-held terminal carried by an owner of electronic value. However, in this case, there is a risk of losing electronic value information due to destruction and missing of devices.

In order to realize recovery from the problem of destruction of electronic information including electronic value information explained above, several technologies have already been proposed. Examples of such prior arts will be explained below.

In the technology disclosed in the JP-A No. H10-133925 as the first related art, data can be backed up for the backup server installed at the outside of fire wall from the inside thereof by utilizing an encrypted mail. However, in this technique, a recovery method from the encrypted data when the key is lost or broken is not considered.

In the technology disclosed in the U.S. Pat. No. 5,778,395 as the second related art, files of node (computer) connected to the network are backed up through compression and encryption to the server on the other node. However, in this technique, recovery of data when the key is lost or broken is not considered as in the case of the first related art.

As explained above, the related arts have been intended to realize backup and recovery of electronic information in the condition that it is concealed by encryption. However, the related explained above is accompanied by a problem that loss or breakdown of device storing electronic information including a key information cannot be covered because it is not considered to recover the encrypted backup information when the key information used for encryption is lost.

Moreover, even when a key used for decoding the encryption to cover the problem explained above can be simply backed up, a measure for illegal action to deteriorate reliability for backup management of key such as conspiracy by the server keeping the key and the server keeping the encrypted electronic value information must be considered.

DISCLOSURE OF THE INVENTION

An object of the present invention is to provide an electronic information backup system that can safely backup electronic value information on a server through communication, reject illegal action at the time of backup and recovery and recover electronic value information from backup at the time of emergency such as the case where the key information is lost.

According to the present invention, there is provided a system that encrypts an electronic value information and then resisters this information to an electronic value information to receive a registration certificate. Next, the system presents the registration certificate to the server to receive the encrypted electronic value information in view of decoding such encrypted electronic value information with a decoding key that is decoded to the data. The decoding key may be kept within a user or in the server or in the other server. Moreover, it is also possible that the electronic value information is divided and moreover the decoding key is divided and these are integrally or partially kept in the same server or in individual servers separately. Moreover, it is also possible that the stream of encryption that is the source of decoding key is kept in a server and thereby a terminal can regenerate the decoding key from such stream of encryption using a decoding key generation algorithm. If the decoding key is lost, such decoding key can be received from the server when inspection of the owner authentication information is completed successful.

BRIEF DESCRIPTION OF DRAWINGS

FIG. 2 is a schematic diagram of an electronic value information, a digest information and a registration certificate in the first embodiment of the present invention.

FIG. 6 is a schematic diagram of a registered electronic value information and a registration certificate in the second embodiment of the present invention.

FIG. 7 is a schematic diagram illustrating a storage method of an encryption key and a decoding key on a key storage means in the second embodiment of the present invention.

FIG. 8 is a schematic diagram illustrating a management method of a key information on a key management storage means in the second embodiment of the present invention.

FIG. 9 is a schematic diagram illustrating an information storage method in an electronic safe storage means in the second embodiment of the present invention.

FIG. 19 is a schematic diagram illustrating electronic value information group on the electronic wallet storage means in the eleventh embodiment of the present invention.

FIG. 20 is a schematic diagram illustrating electronic value information group on the electronic wallet storage means in the eleventh embodiment of the present invention.

PREFERRED EMBODIMENTS OF THE INVENTION

Figure 1:
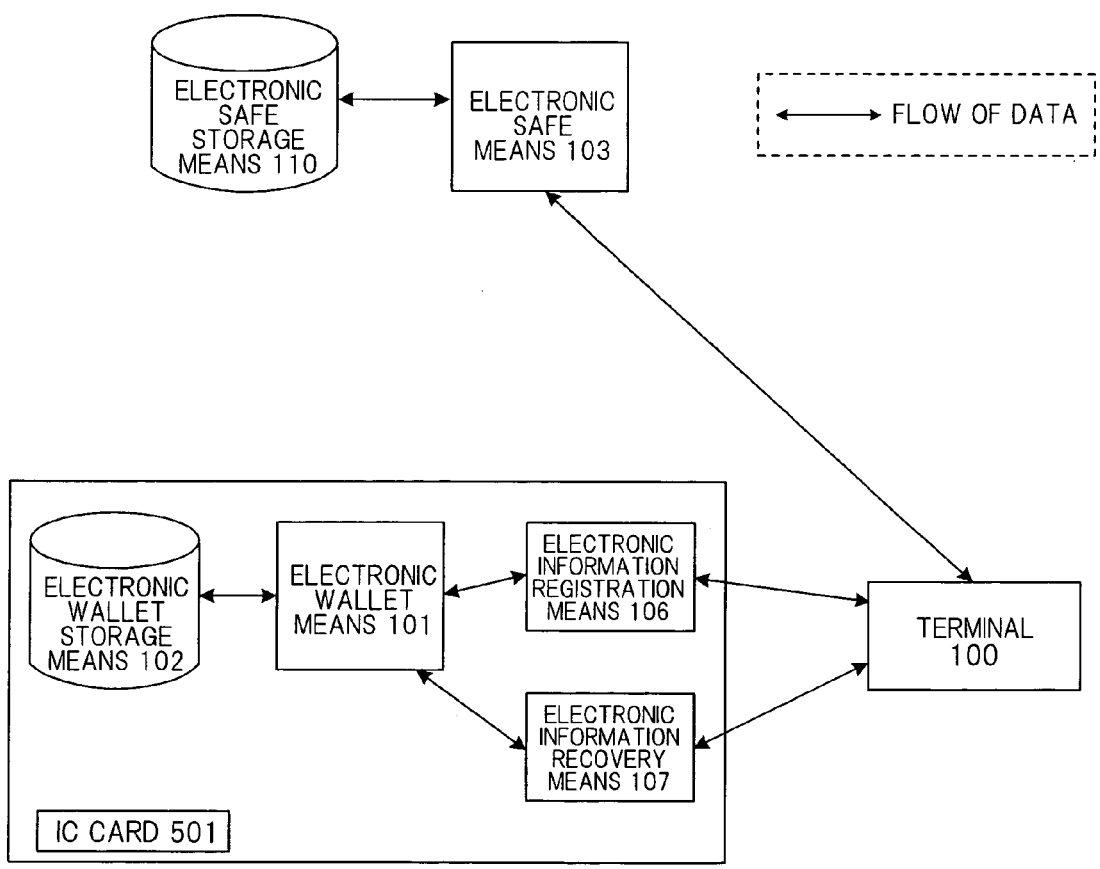
FIG. 1 is a structural diagram of an electronic information backup system in a first embodiment of the present invention.

The present invention discloses, first, that a local electronic value information is registered to an electronic safe server to receive a registration certificate thereof and such registration certificate is presented to the electronic safe server to obtain the corresponding electronic value information. Thereby, if the local electronic value information is destroyed, such electronic value information can be recovered.

The present invention discloses, second, the local electronic value information is encrypted and is then backed up on the electronic safe server. Thereby, the electronic value information can be backed up under the condition that it is shielded within the electronic safe server and even if the local electronic value information is destroyed, the electronic value information can be recovered.

Third, the present invention discloses that decoding keys for decoding the encrypted electronic value information are backed up in different electronic safe servers. Thereby, the electronic value information can be stored more safely.

Fourth, the present invention discloses that an electronic value information is divided and the divided information pieces are then backed up in different electronic safe servers. Thereby, difficulty for illegally obtaining such decoding keys by tapping of all communication paths or illegal entry to all electronic safe servers during the backup operation becomes very high. Moreover, when independency of respective electronic safe servers is high, possibility for illegal recovery of the decoding keys due to the conspiracy of the electronic safe server management personnel can also be lowered.

Fifth, the present invention discloses that a plurality of electronic value information pieces are combined and then encrypted and thereby these encrypted information pieces are backed up in the electronic safe servers and such combined information is isolated when it is obtained from the electronic safe server and is then recovered as the electronic value information. Thereby, difficulty for illegally obtaining such decoding keys by tapping of all communication paths or illegal entry to all electronic safe servers during the backup operation also becomes very high. Moreover, when independency of respective electronic safe server is high, possibility for illegal recovery of the decoding keys by conspiracy of the electronic safe server management personnel can also be lowered.

Sixth, the present invention discloses that the decoding key is divided and one divided decoding key is backed up in one electronic safe server, while the other divided decoding key is backed up in the other electronic safe server. Thereby, difficulty for illegally obtaining the decoding keys by tapping of all communication paths and illegal entry to all electronic safe servers during the backup operation also becomes high. Moreover, when independency of respective electronic safe servers is high, possibility for illegal recovery of the decoding keys by conspiracy of the electronic safe server management personnel can be lowered.

Seventh, the present invention discloses that an original cryptographic seed information to be used for arithmetic generation of decoding keys is backed up in the electronic safe server, such cryptographic seed information is received from the electronic safe server at the time of recovery and the decoding key is generated from the cryptographic seed information via the decoding key generation algorithm. Thereby, safety not only electronic value information but also for decoding key becomes extremely high.

The present invention enables, eighth, acquisition of electronic value information from the electronic safe server when the owner information is matched with the authentication information. Thereby, even if the decoding key is lost or data cannot be extracted because terminals are destroyed, the decoding keys can be obtained from the electronic safe servers to recover the electronic value information.

Ninth, the present invention discloses that the electronic value information is selected depending on the preset backup conditions. Thereby, since the electronic value information to be backed up is selected automatically based on the preset conditions in place of manual selection by a user, a load of user can be alleviated and thereby the memory capacity of terminals and cost (time, expense) required for communication can also be controlled.

Tenth, the present invention discloses that since a set of electronic value information and decoding key is returned through communication between the electronic safe servers when the owner is authenticated as the correct information owner through the authentication in such a case that the electronic value information and decoding key are stored in different safe servers for keeping the safety, the electronic value information can be recovered even in the case where the decoding key is lost and the data cannot be extracted because the terminals are destroyed. Moreover, when the electronic value information is not used immediately, such information can be returned to the preceding condition by encrypting the electronic value information using a new encryption key and then sending the encrypted information to one electronic safe server and the other decoding key the other electronic safe server.

EMBODIMENTS

The preferred embodiments of the present invention will be explained with reference to the accompanying drawings. The present invention is not limited only to these embodiments and may be modified and embodied within the scope not departing from the subject matter thereof. Each figure will be indicated as FIG. 1, FIG. 2, . . . .

First Embodiment

The first embodiment in relation to first, second, and third aspect of the present invention will be explained with reference to FIG. 1, FIG. 2, FIG. 3 and FIG. 4. FIG. 1 is a structural diagram illustrating an example of the electronic information backup system explained in this first embodiment. This system is assumed to be basically composed of computers connected with the wired or wireless communication path, external extension devices and softwares operating on these elements. Here, a computer is the general name of the devices including a CPU operating depending in the software programs.

In this first embodiment, an electronic wallet means 101, an electronic wallet storage means 102, an electronic information registration means 106 and an electronic information recovery means 107 are comprised within an IC card 501. A terminal 100 is a portable telephone terminal comprising an IC card reader/writer and is capable of making communication with the electronic information registration means 106 and electronic information recovery means 107 formed within the IC card 501. The terminal 100 can communicate with the electronic safe means 103 as the server through the wireless link. Moreover, the terminal 100 may be replaced with a personal computer comprising the IC card reader or a set-top box or a portable personal computer.

Communication between the terminal 100 and electronic safe means 103 may be executed with the wired link. It is also possible to structure the device having the identical function to that of the IC card 501 within the terminal 100.

The electronic wallet means 101, electronic information registration means 106 and electronic information recovery means 107 are realized with the software, storage region for storing this software and OS for executing this software by interpreting it and CPU. Moreover, the electronic wallet means 101 is capable of making reference to the content of the electronic wallet storage means 102 and also capable of changing the content. The electronic wallet storage means 102 can be realized with a programmable memory such as EEPROM.

Figure 3:
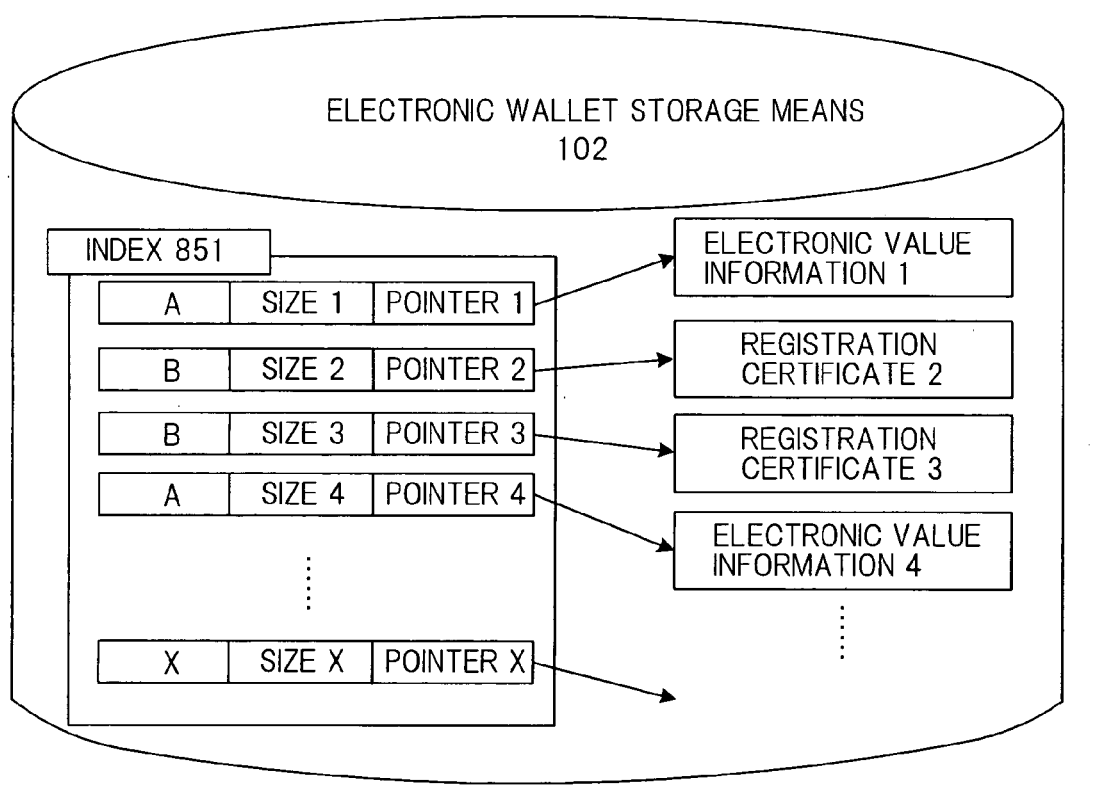
FIG. 3 is a schematic diagram illustrating a management method of electronic value information and registration certificate on an electronic wallet means in the first embodiment of the present invention.

An electronic value information means an electronic information such as electronic cash, electronic ticket and electronic coupon or the like and the registration certificate means an electronic information indicating a duplicate of the electronic value information issued when the electronic value information is registered to the electronic safe means 103. FIG. 3 illustrates a management method of electronic value information and registration certificate in the electronic wallet storage means 102. The electronic wallet means 101 places an index 851 on the electronic wallet storage means 102. The index 851 summarizes the pointers for the information stored in the electronic wallet storage means 102, size of information and a set of the signs indicating a class of the information indicated with the pointer. Using this index 851, the electronic wallet 101 can realize the functions explained below.

The electronic wallet means 101 obtains the pointer and size with reference to the index 851 in the electronic wallet storage means 102 and can extract the electronic value information or registration certificate using the pointer and size acquired. The electronic wallet means 101 obtains all pointers and sizes with reference to the index 851 in the electronic wallet storage means 102; and also acquires all electronic value information pieces and titles of the registration certificates using such pointers and sizes. It is also possible to generate a list of all storage information pieces using the pointers, sizes and titles. Moreover, it is also possible to generate a list of the information matched with the conditions (for example, the list of the registration certificates and the list of information within the remaining one week until the end of effective period) by obtaining the pointers and sizes matched with the particular conditions.

Moreover, the electronic wallet means 101 writes the electronic value information or registration certificate in the vacant region in the electronic wallet storage mans 102 and adds the entry of a set of the corresponding class, pointer and size to the index 851 in view of storing the electronic value information or registration certificate to the electronic wallet storage means 102. On the contrary, the electronic value information or registration certificate can be deleted from the electronic wallet storage means 102 by erasing the region indicated with the pointer and size and then deleting the entry corresponding to the pointer and size from the index 851 with reference to the pointer and size indicated in the index 851. Moreover, the electronic value information or registration certificate information can be corrected by combining the new registration and deletion. The process explained above may also be realized using the functions of the file system of the operating system (OS) on the IC card 501.

The electronic information registration means 106 is composed of a software, a storage region for storing this software, an OS for interpreting and executing this software and a CPU. This electronic information registration means 106 and electronic wallet means 101 can use the OS and CPU in common. The electronic information registration means 106 obtains the electronic value information from the electronic wallet means 101 and registers the registration certificate to the electronic wallet means 101. Moreover, obtains a list of the electronic value information from the electronic wallet means 101.

The electronic information recovery means 107 can be composed of a software, a storage region for storing this software, an OS for interpreting and executing this software and a CPU. Here, the electronic information recovery means 107 and electronic wallet means 101 can use OS and CPU in common. The electronic information recovery means 107 acquires the registration certificate from the electronic wallet means 101 and registers the electronic value recovery information to the electronic wallet means 101. In addition, the electronic information recovery means 107 acquires a list of the registration certificate from the electronic wallet means 101.

The electronic safe means 103 is composed of a computer such as a work station or a personal computer and a software operating on the computer system. The electronic safe means 1103 can refer to the content of the electronic safe storage means 110 and modifies such content. The electronic safe storage means 110 is a storage device having the content to be referred or modified from the electronic safe means 103 and may be realized with a hard disc. On the electronic safe storage means 110, a file system under the management of the computer system OS is established.

FIG. 2(a) illustrates the electronic value information 201 as an example of the electronic value information. When the electronic safe means 103 accepts a registration request of the electronic value information 201, it generates a registration certificate 301 using the electronic value information 201. The flow of process to generate the registration certificate 301 will be explained below.

The electronic safe means 103 generates a digest 302 illustrated in FIG. 2(b) from the electronic value information 201 based on the setting. Moreover, the means 103 also generates the value X1 by applying the electronic value information 201 to the uni-directional Hash function. The value Y1 is obtained with reference to a counter of the electronic safe means 103. The counter increases one by one in the ascending sequence and returns to 0 when the value reaches the upper limit. These digest 302, Hash value X1 and counter value Y1 are set as the registration certificate 301. Here, MD5 and SHA1 having higher dispersion property are used as the Hash function to generate the value X1. The digest 302 may be a vacant information.

Figure 4:
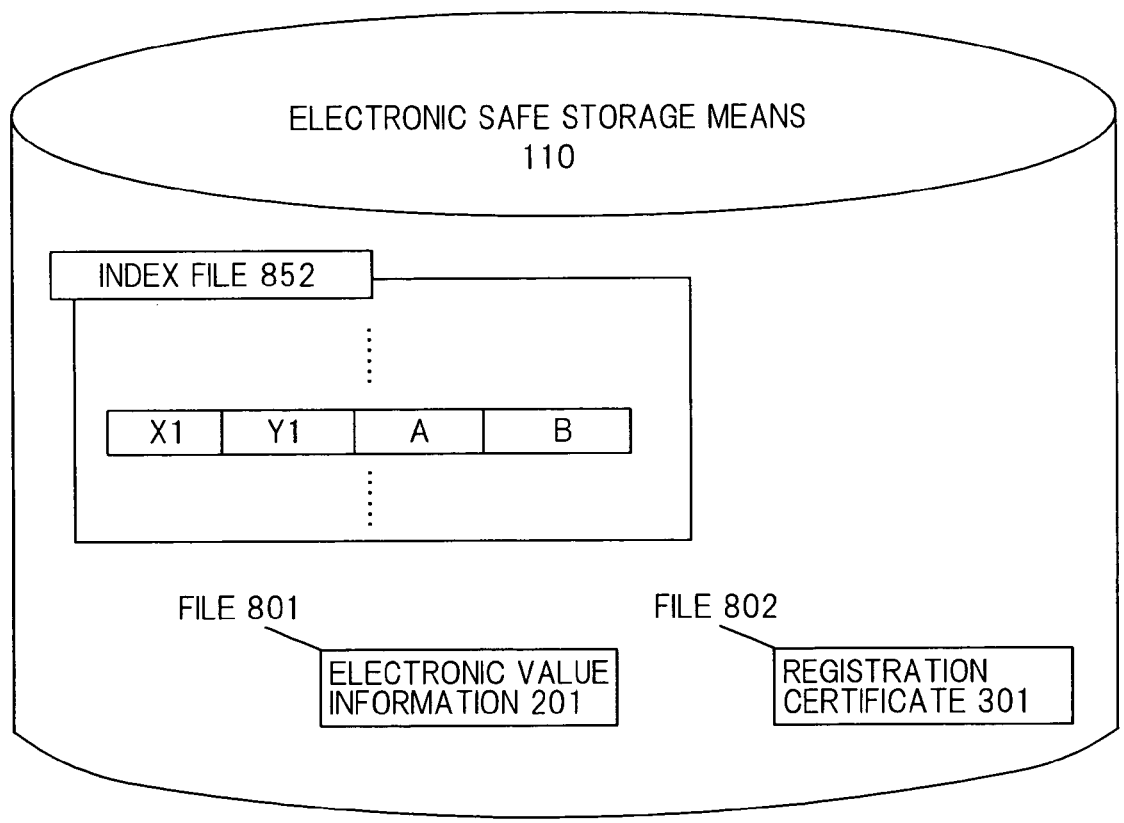
FIG. 4 is a schematic diagram illustrating an information storage method in an electronic safe storage means in the first embodiment of the present invention.

FIG. 4 illustrates a method of storing information on the electronic safe storage means 110. The electronic safe means 103 stores the electronic value information 201 to the electronic safe means 110 as a file 801 and the registration certificate 301 as a file 802. A path information of the Hash value X1, counter value Y1 and file 801 as the structural element of the registration certificate 301 and a path information of file 802 are formed as a set and this set is then registered as an entry of the index file 852. The index file 852 is a single-line CSV file for one entry and each line is sorted in the ascending sequence with the counter value. When the registration certificate is presented to the electronic safe means 103 from the terminal 100, the electronic safe means 103 searches the entry group where the electronic value information corresponding to the registration certificate is matched with the count value from the index file 852 in the electronic safe storage means 110 and further squeezes such entry group to the entry group where the Hash value is matched and then extracts the entry where the registration certificate is perfectly matched. Thereby, it is now possible to search the electronic value information corresponding to the registration certificate at a high speed.

Procedures for a user 100 for backup of the electronic value information 201 by manipulating a terminal 100 will be explained using each means. Operations in the following procedures are performed with user under the condition that the IC card 501 is loaded to the terminal 100.

(1-1)
The terminal 100 requests an electronic value information list to the electronic information registration means 106.

(1-2)
The electronic information registration means 106 requests the electronic value information list to the electronic wallet means 101.

(1-3)
The electronic wallet mans 101 generates the electronic value information list and sends it to the electronic information registration means 106.

(1-4)
The electronic information registration means 106 sends the electronic value information list to the terminal 100.

(1-5)
The terminal 100 requests the electronic value information 201 selected from the electronic value information list to the electronic information registration means 106.

(1-6)
The electronic information registration means 106 requests the electronic value information 201 to the electronic wallet means 101.

(1-7)
The electronic wallet means 101 obtains the electronic value information 201 from the electronic wallet storage means 102 and then sends it to the electronic information registration means 106.

(1-8)
The electronic information registration means 106 sends the electronic value information 201 to the terminal 100.

(1-9)
The terminal 100 sends registration of the electronic value information 201 to the electronic safe means 103.

(1-10)
The electronic safe means 103 stores the electronic value information 201 to the electronic safe storage means 110.

(1-11)
The electronic safe means 103 sends the registration certificate 301 to the terminal 100.

(1-12)
The terminal 100 sends the registration certificate 301 to the electronic information registration means 106.

(1-13)
The electronic information registration means 106 requests registration of registration certificate 301 to the electronic wallet means 101.

(1-14)
The electronic wallet means 101 respectively collates the content of electronic value information 201 with the digest 302 of the registration certificate 301 and also Hash calculation value of the electronic value information 201 with the Hash value X1 of the registration certificate 301 and stores, when matching is obtained, the registration certificate 301 to the electronic wallet storage means 102 and then sends the end message to the electronic information registration means 106. When matching is not obtained, the electronic wallet means 101 sends an error message.

(1-15)
The electronic information registration means 106 sends the end message or error message obtained from the electronic wallet means 101 to the terminal 100.

Here, when the registration certificate 301 is stored normally in the electronic wallet storage means 102, the electronic value information 201 can be deleted from the electronic wallet storage means 102. When a device having a smaller storage capacity like an IC card is used, this is an effective means to effectively use the storage capacity.

Next, procedures for a user to recover the electronic value information 201 corresponding to the registration certificate 301 stored in the electronic wallet storage means 102 on the electronic wallet storage means 102 by manipulating the terminal 100 will be explained below.

(2-1)

The terminal 100 requests the registration certificate list to the electronic information recovery means 107.

(2-2)

The electronic information recovery means 107 requests the registration certificate list to the electronic wallet means 101.

(2-3)

The electronic wallet means 101 generates the registration certificate list and sends this list to the electronic information recovery means 107.

(2-4)

The electronic information recovery means 107 sends the registration certificate list to the terminal 100.

(2-5)

The terminal 100 requests the registration certificate 301 selected from the registration certificate list to the electronic information recovery means 107.

(2-6)

The electronic information recovery means 107 requests the registration certificate 301 to the electronic wallet means 101.

(2-7)

The electronic wallet means 101 obtains the registration certificate 301 from the electronic wallet storage means 102 and then sends it to the electronic information recovery means 107.

(2-8)

The electronic information recovery means 107 sends the registration certificate 301 to the terminal 100.

(2-9)

The terminal 100 presents the registration certificate 301 to the electronic safe means 103 to request acquisition of the corresponding electronic value information.

(2-10)

The electronic safe means 103 searches and obtains the electronic value information 201 using the registration certificate 301 and sends this information to the terminal 100. In this case, the electronic safe means 103 collates the content of the searched electronic value information with the registration certificate 301 and then stops, when mismatching is obtained, the recovery process of the electronic value information 201.

(2-11)

The terminal 100 sends the electronic value information 201 to the electronic information recovery means 107.

(2-12)

The electronic information recovery means 107 requests registration of the electronic value information 201 to the electronic wallet means 101.

(2-13)

The electronic wallet means 101 registers the electronic value information 201 to the electronic wallet storage means 102.

(2-14)

The electronic information recovery means 107 sends the end message to the terminal 100.

As explained above, according to the electronic information backup system of the first embodiment, the electronic value information of user can be backed up on the electronic safe storage means, the summary of the electronic value information backed up can be recognized without inquiry to the electronic safe means and the electronic value information can be recovered on the electronic wallet storage means as required.

Second Embodiment

Figure 5:
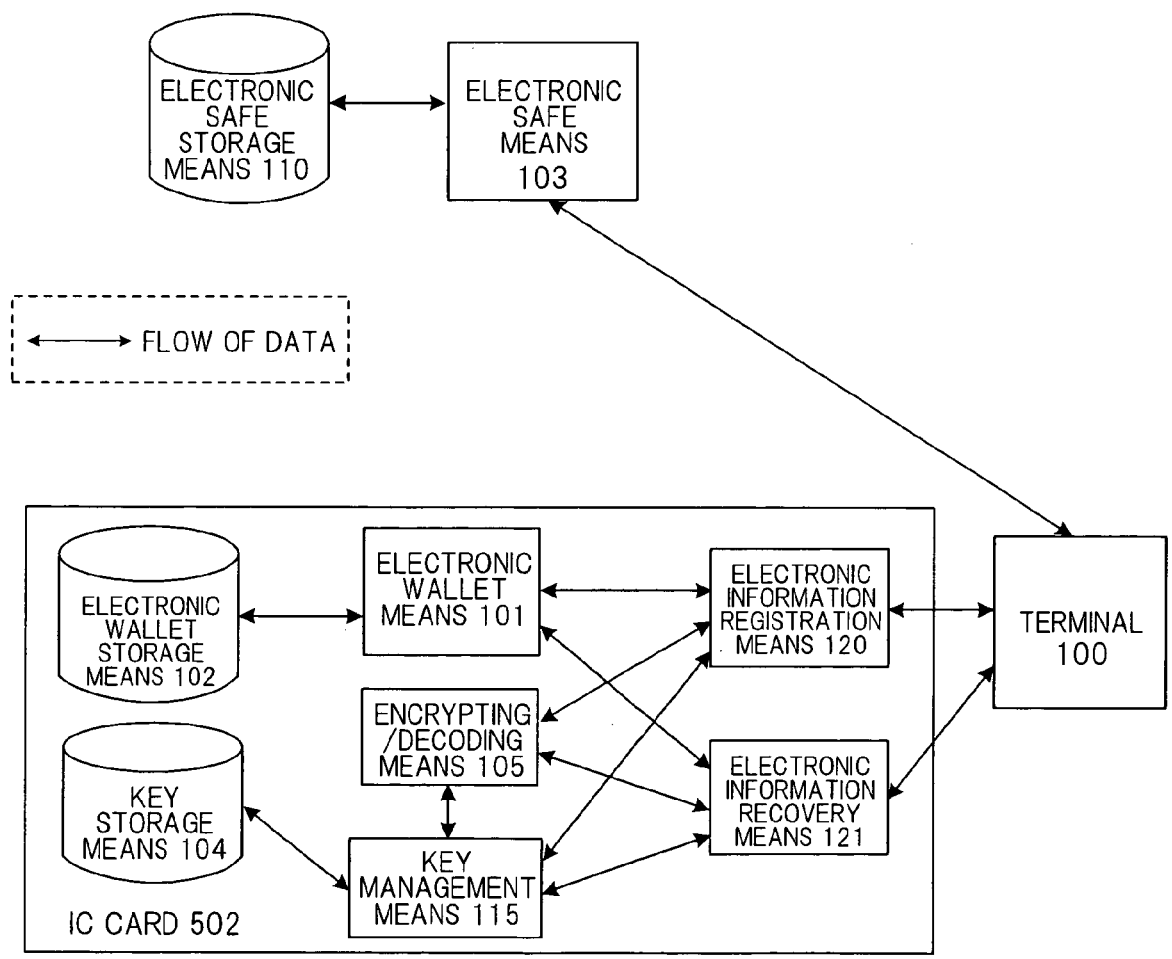
FIG. 5 is a structural diagram of an electronic information backup system in a second embodiment of the present invention.

Next, the second embodiment in relation to fourth and fifth aspects of the present invention will be explained with reference to FIGS. 5 to 9. FIG. 5 is a structural diagram illustrating an example of the electronic information backup system of the second embodiment. This system replaces the terminal 100 of the system illustrated in the first embodiment (FIG. 1) with a terminal 112, the electronic safe means 103 with an electronic safe means 113 and the IC card 501 with an IC card 502. The IC card 502 is formed by adding an encrypting/decoding means 105, a key storage means 104 and a key management means 115 to the IC card 501, modifies the electronic information registration means 106 to the electronic information registration means 120 and also modifies the electronic information recovery means 107 to the electronic information recovery means 121.

The encrypting/decoding means 105 is formed comprising a software, a storage area for storing this software, an OS for interpreting and executing this software and a CPU. The key storage means 104 realizes a programmable memory such as EEPROM. Here, the encrypting/decoding means 105 and the electronic wallet means 101 can use in common the OS and CPU. Moreover, the key storage means 104 and electronic wallet storage means 102 can use in common the EEPROM.

The key storage means 104 stores, as illustrated in FIG. 7, an encryption key 401 and a decoding key 402. In this second embodiment, a pair of the encrypting key 401 and the decoding key 402 stored in the key storage means 104 is generated with the encrypting/decoding means 105. The encrypting/decoding means 105 uses the public key encryption system, defining the encrypting key 401 as a public key and the decoding key 402 as a secret key.

Here, it is also possible to use the common key encryption system as the encryption system of the encrypting/decoding means 105. In this case, the encrypting key 401 and decoding key 402 become the identical key. The key management means 115 has the function to obtain the key stored in the key management means 104, the function to register a new key to the key storage means 104 and the function to delete the existing keys from the key management means 104.

The encrypting/decoding means 105 has the function to obtain the encryption key from the key storage means 104 via the key management means 115 and return the encrypted electronic information attained by encrypting the input electronic information with the encryption key 401, the function to obtain the decoding key 402 from the key storage means 104 via the key management means 115 and return the electronic information by decoding the input encrypted electronic information with the decoding key 402 and the function to generate the encrypted information (electronic signature) that is obtained by encrypting the Hash value for the input information using the encryption key 401. Moreover, on the contrary, such encrypting/decoding means 105 also has the function to inspect the electronic signature using the decoding key 402. Here, the encryption key 401 and the decoding key 402 may be the encryption key of the common key encryption system that is intrinsic to the IC card 502. Moreover, the encryption key 401 and decoding key 402 respectively may be a pair of keys of the public key and secret key of the public key encryption system intrinsic to the IC card 502.

The electronic information registration means 120 has all functions identical to that of the electronic information registration means 106 of the first embodiment and simultaneously has the function to generate the registration electronic value information 203 as illustrated in FIG. 6(*a*). The electronic information registration means 120 obtains the encryption electronic value information 202 from the electronic value information 201 using the encrypting/decoding means 105, generates the digest 302 using the information extracted from the electronic value information 201 and also generates the registration electronic value information 203 by combining the digest 302, encryption electronic value information 202 and the signature 303 generated from the information summarized from the digest 302 and encryption electronic value information 202 using the encrypting/decoding means 105. Moreover, such electronic information registration means 120 also has the function to obtain the key information from the key storage means 104 via the key management means 115.

The electronic information recovery means 121 has all functions identical to that of the electronic information recovery means 107 and simultaneously has the function to extract the encryption information value information 202 from the registration electronic value information 203 after the checking of validity of the signature 303 in the registration electronic value information 203 using the encrypting/decoding means 105 and then decode the electronic value information 201 from the encryption electronic value information 202 using the encrypting/decoding means 105. Moreover, the electronic information recovery mean 121 has the function to register the key information to the key storage means 104 via the key management mean 115.

The electronic safe means 113 is modified from the software of the electronic safe means 103 illustrated in FIG. 1 and the electronic safe means 113 can refer to and modify the content of the electronic safe storage means 110. When the electronic safe means 113 has received the request for registration of the registration electronic value information 203, it generates the registration certificate 304 illustrated in FIG. 6(*b*) using the registration electronic value information 203. The flow of process to generate the registration certificate 304 will be explained below.

The electronic safe means 113 extracts the digest 302 from the registration electronic value information 203. Moreover, it generates the value X2 by applying the encryption electronic value information 202 to the uni-directional Hash function and also obtains the value Y2 by referring to the counter provided in the electronic safe means 113. This counter is assumed to increase one by one in the ascending sequence for every reference and then returns to zero when the value reaches the upper limit. These digest 302, Hash value X2 and counter value Y2 are formed as a set of registration certificate 304. As the Hash function used to generate the value X2, MD5 and SHA1 having higher dispersion property are used. Since the registration certificate 304 includes the information of digest 302, summary of the electronic value information registered can be detected by referring to the registration certificate 304. Here, the digest 302 may be a vacant information but in this case, the summary of electronic value information cannot be detected from the registration certificate 304.

Moreover, when the electronic safe means 113 has received the registration request of the decoding key 402, it generates the registration certificate 305 illustrated in FIG. 8(*a*). The registration certificate 305 is composed of the digest 305 indicating this registration certificate corresponds to the key information, the Hash value X3 generated from the decoding key 402 and the counter value Y3 comprised in the electronic safe means 113. As illustrated in FIG. 8(*b*), the digest 306 is composed of an information class and a key information indicating that the registration certificate corresponds to the key information.

The registration certificate 304 for the electronic value information is discriminated from the registration certificate 305 for the key information from difference between the information class included in the registration certificate 304 for the electronic value information and the information class included in the registration certificate 305 corresponding to the key information. Thereby, when the electronic safe means 113 stores the electronic value information and key information to the electronic safe storage means 110, the same management method can be used for these registration certificates. FIG. 9 illustrates such management method.

The electronic safe means 113 as all functions of the electronic safe means 103 in the first embodiment and also stores, to the electronic safe storage means 110, the registration electronic value information 203 as the file 803, the registration certificate 304 as the file 804, the decoding key 402 as the file 805 and registration certificate 305 as the file 806, respectively. The Hash value X2 and counter value Y2 as the structural element of registration certificate 304, the path information of file 803 and the path information of file 804 are combined as a set and this set is registered as an entry of the index file 853. Moreover, the Hash value X3 and counter value Y3 as the structural element of registration certificate 305, path information of file 805 and path information of file 806 are combined as a set and this set is registered as one entry of the index file 853. The index file 853 is the single line CSV file of one entry and each line is sorted in the ascending sequence with the counter value. When the registration certificate is presented to the electronic safe means 113 from the terminal 112, the electronic safe means 113 searches, from the index file 853 in the electronic safe storage means 110, an entry group where the electronic value information corresponding to the registration certificate is matched with the counter value and further squeezes the entry group where the Hash value is matched to extract the entry where the registration certificate is perfectly matched. Thereby, the electronic value information corresponding to the registration certificate is searched at a high speed. Here, the index files for the electronic value information and key information may be discriminated.

Next, the procedures for a user to backup the electronic value information 201 through manipulation of the terminal 112 will be explained below. The selecting operations in the following procedures are performed with a user.

(1-1)

The terminal 112 requests the electronic value information list to the electronic information registration means 120.

(1-2)

The electronic information registration mans 120 requests the electronic value information list to the electronic wallet means 101.

(1-3)

The electronic wallet means 101 generates the electronic value information list and sends this list to the electronic information value registration means 120.

(1-4)

The electronic information registration means 120 sends the electronic value information list to the terminal 112.

(1-5)

The terminal 112 notifies selection of the electronic value information 201 selected from the electronic value information list to the electronic information registration means 120.

(1-6)

The electronic information registration means 120 requests the electronic value information 201 to the electronic wallet means 101.

(1-7)

The electronic wallet means 101 acquires the electronic value information 201 from the electronic wallet storage means 102 and then sends this information to the electronic information registration means 120.

(1-8)

The electronic information registration means 120 acquires the encryption electronic value information 202 from the electronic value information 201 using the encrypting/decoding means 105 and generates the registration electronic value information 203 from the electronic value information 201 and encryption electronic value information 202.

(1-9)

The electronic information registration means 120 sends the registration electronic value information 203 to the terminal 112.

(1-10)

The terminal 112 requests registration of the registration electronic value information 203 to the electronic safe means 113.

(1-11)

The electronic safe means 113 stores the registration electronic value information 203 to the electronic safe storage means 110 and simultaneously generates the registration certificate 304 from the registration electronic value information 203.

(1-12)

The electronic safe means 113 sends the registration certificate 304 to the terminal 100.

(1-13)

The terminal 112 sends the registration certificate 304 to the electronic information registration means 120.

(1-14)

The electronic information registration means 120 requests registration of the registration certificate 204 to the electronic wallet means 101.

(1-15)

The electronic wallet means 101 collates respectively the digest generated from the content of electronic value information 201 and the digest 302 of the registration certificate 304 with the value obtained by Hash calculation of the digest and the Hash value X2 of the registration certificate 304 and stores, when matching is attained, the registration certificate 304 to the electronic wallet storage means 102 and then sends the end message to the electronic information registration means 120 or sends, when matching is not attained, an error message.

(1-16)

The electronic information registration means 120 sends the end message or error message obtained from the electronic wallet means 101 to the terminal 112.

Next, the procedures for a user to recover, on the electronic wallet storage means 102 by manipulating the terminal 112, the electronic value information 201 corresponding to the registration certificate 304 stored in the electronic wallet storage means 102 will be explained below.

(2-1)

The terminal 112 requests the registration certificate list to the electronic information recovery means 121.

(2-2)

The electronic information recovery means 121 requests the registration certificate list to the electronic wallet means 101.

(2-3)

The electronic wallet means 101 generates the registration certificate list and sends this list to the electronic information recovery means 121.

(2-4)

The electronic information recovery means 121 sends the registration certificate list to the terminal 112.

(2-5)

The terminal 112 requests the registration certificate 304 selected from the registration certificate list to the electronic information recovery means 121.

(2-6)

The electronic information recovery means 121 requests the registration certificate 304 to the electronic wallet means 101.

(2-7)

The electronic wallet means 101 acquires the registration certificate 304 from the electronic wallet means 102 and sends it to the electronic information recovery means 121.

(2-8)

The electronic information recovery means 121 sends the registration certificate 304 to the terminal 112.

(2-9)

The terminal 112 presents the registration certificate 304 to the electronic safe means 113 and requests acquisition of the corresponding electronic value information.

(2-10)

The electronic safe means 103 searches and acquires the registration electronic value information 203 using the registration certificate 304 and sends it to the terminal 112. In this case, the electronic safe means 103 collates the content of the searched electronic value information with the registration certificate 304 and stops, when matching is not attained, the recovery process of the electronic value information 201.

(2-11)

The terminal 112 sends the registration electronic value information 203 to the electronic information recovery means 121.

(2-12)

When the electronic information recovery means 121 inspects and recognizes the signature 303 of the registration electronic value information 203 using the encrypting/decoding means 105, the encryption electronic value information 202 extracted from the registration electronic value information 203 is decoded using the encrypting/decoding means 105 to obtain the electronic value information 201.

(2-13)
The electronic information recovery means 121 requests registration of the electronic value information 201 to the electronic wallet means 101.

(2-14)
The electronic wallet means 101 registers the electronic value information 201 to the electronic wallet storage means 102.

(2-15)
The electronic information recovery means 121 sends the end message to the terminal 112.

Moreover, the procedures for a user to backup the decoding key 402 by manipulating the terminal 112 will be explained below. The selecting operations in the following procedures are all performed with a user.

(3-1)
The terminal 112 requests the decoding key 402 to the electronic information registration means 120.

(3-2)
The electronic information registration means 120 requests the decoding key 402 to the key management means 115.

(3-3)
The key management means 115 acquires the decoding key 402 from the key storage means 104 and sends this decoding key 402 to the electronic information registration means 120.

(3-4)
The electronic information registration means 120 sends the decoding key 402 to the terminal 112.

(3-5)
The terminal 112 requests registration of the decoding key 402 to the electronic safe means 113.

(3-6)
The electronic safe means 113 stores the decoding key 402 to the electronic safe storage means 110 and simultaneously generates the registration certificate 305.

(3-7)
The electronic safe means 113 sends the registration certificate 305 to the terminal 112.

(3-8)
The terminal 112 sends the registration certificate 305 to the electronic information registration means 120.

(3-9)
The electronic information registration means 120 requests registration of the registration certificate 305 to the electronic wallet means 101.

(3-10)
The electronic wallet 101 stores the registration certificate in the electronic wallet storage means 102 and sends the end message to the electronic information registration means 120.

(3-11)
The electronic information registration means 120 sends the end message or error message obtained from the electronic wallet means 101 to the terminal 112.

Next, the procedures for a user to recover, on the key storage means 104, the decoding key 402 corresponding to the registration certificate 305 stored in the electronic wallet storage means 102 by manipulating the terminal 112 will be explained below.

(4-1)
The terminal 112 requests the registration certificate list to the electronic information recovery means 121.

(4-2)
The electronic information recovery means 121 requests the registration certificate list to the electronic wallet means 101.

(4-3)
The electronic wallet means 101 generates the registration certificate list and sends it to the electronic information recovery means 121.

(4-4)
The electronic information recovery means 121 sends the registration certificate list to the terminal 112.

(4-5)
The terminal 112 requests the registration certificate 305 selected from the registration certificate list to the electronic information recovery means 101.

(4-6)
The electronic information recovery means 121 requests the registration certificate 305 to the electronic wallet means 101.

(4-7)
The electronic wallet means 101 acquires the registration certificate 305 from the electronic wallet storage means 102 and sends it to the electronic information recovery means 121.

(4-8)
The electronic information recovery means 121 sends the registration certificate 305 to the terminal 112.

(4-9)
The terminal 112 presents the registration certificate 305 to the electronic safe means 113 to request acquisition of the corresponding decoding key.

(4-10)
The electronic safe means 103 searches the decoding key 402 using the registration certificate 305 and sends it to the terminal 112.

(4-11)
The terminal 112 sends the decoding key 402 to the electronic information recovery means 121.

(4-12)
The electronic information recovery means 121 requests registration of the decoding key 402 to the key management means 115.

(4-13)
The key management means 115 registers the decoding key 402 to the key storage means 104.

(4-14)
The electronic information recovery means 121 sends the end message to the terminal 112.

Here, communication between the electronic information registration means 120 and electronic safe means 113 may be made with the encrypted communication method in order to prevent tapping of the communication path including the terminal 112. In this case, it is impossible for the terminal 112 to detect the content of information. Moreover, communication between the electronic information recovery means 121 and the electronic safe means 113 also may be made with the encrypted communication method in order to prevent tapping of the communication path including the terminal 112. In this case, the terminal 112 also cannot detect the content of information of communication.

As explained above, according to the electronic information backup system of the second embodiment, the electronic value information can be recovered, even when the key storage means is destroyed, by encrypting the electronic value information of the user using a secret key for the electronic safe mans for the purpose of backup, locally detecting the summary of the backup electronic value information, recovering the encrypted backup electronic value information as required from the electronic safe means and then storing the decoding key in the electronic safe means.

Third Embodiment

Figure 10:
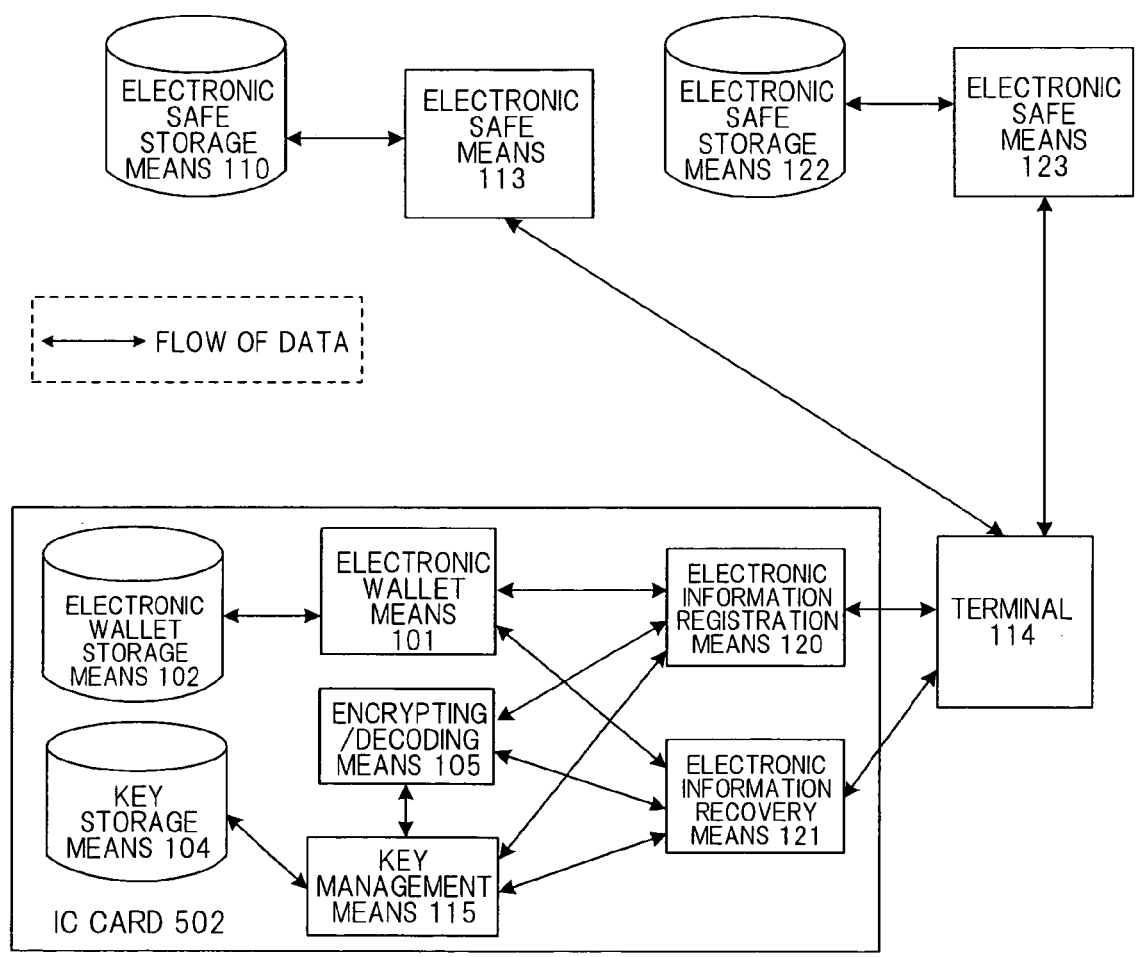
FIG. 10 is a structural diagram of an electronic information backup system in a third embodiment of the present invention.

Next, the third embodiment in relation to a sixth aspect of the present invention will be explained with reference to FIG. 10. FIG. 10 is a structural diagram illustrating an example of the electronic information backup system of the third embodiment. This system replaces the terminal 112 of the system of the second embodiment (FIG. 5) with the terminal 114 and additional provides the electronic safe means 123 for making communication with the terminal 114 and the electronic safe storage means 122 as a storage device of the electronic safe means 123. The electronic safe means 123 and electronic safe storage means 122 have the functions identical to that of the electronic safe means 113 and electronic safe storage means 110. The terminal 114 has all functions that are identical to the functions of the terminal 112 and simultaneously has the function to backup the electronic value information and decoding key for the electronic safe means 123.

In the third embodiment, the registration electronic value information 203 generated from the electronic value information 201 is backed up for the electronic safe means 113 and the decoding key 402 is also backed up for the electronic safe means 123. The backup sequence of the decoding key 402 is identical to that of the second embodiment, except for that the backup destination is changed to the electronic safe means 123 from the electronic safe means 113. Therefore, the electronic value information 201 is never decoded for the electronic safe means 113 and electronic safe means 123, unless otherwise there is conspiracy by the electronic safe means 113 and electronic safe means 123.

Here, the communication between the electronic information registration mans 120 and electronic safe means 113 may be encrypted in order to prevent the tapping in the communication path including the terminal 114. In this case, the terminal 114 cannot detect content of information under the communication. Moreover, the communication between the electronic information recovery means 121 and electronic safe means 113 may be encrypted in order to prevent the tapping in the communication path including the terminal 114. In this case, the terminal 114 cannot detect content of information under the communication.

Moreover, the communication between the electronic information registration means 120 and electronic safe means 123 may also be encrypted in order to prevent the tapping in the communication path including the terminal 114. In this case, the terminal 114 cannot detect content of the information under the communication. Moreover, the communication between the electronic information recovery means 121 and electronic safe means 123 may also be encrypted in order to prevent the tapping in the communication path including the terminal 114. In this case, the terminal 114 cannot detect content of the information under the communication.

As explained above, according to the electronic information backup system of the third embodiment, it is possible to make it impossible, unless otherwise there is conspiracy between two electronic safe means, to obtain the original electronic value information by backing up the electronic value information of user to the electronic safe means through the encryption using a secret key, locally detecting the summary of the backed up electronic value information, recovering the electronic value information backed up through the encryption as required from the electronic safe means and storing the decoding key to the electronic safe means that is different from that storing the encrypted electronic value information.

Fourth Embodiment

Figure 11:
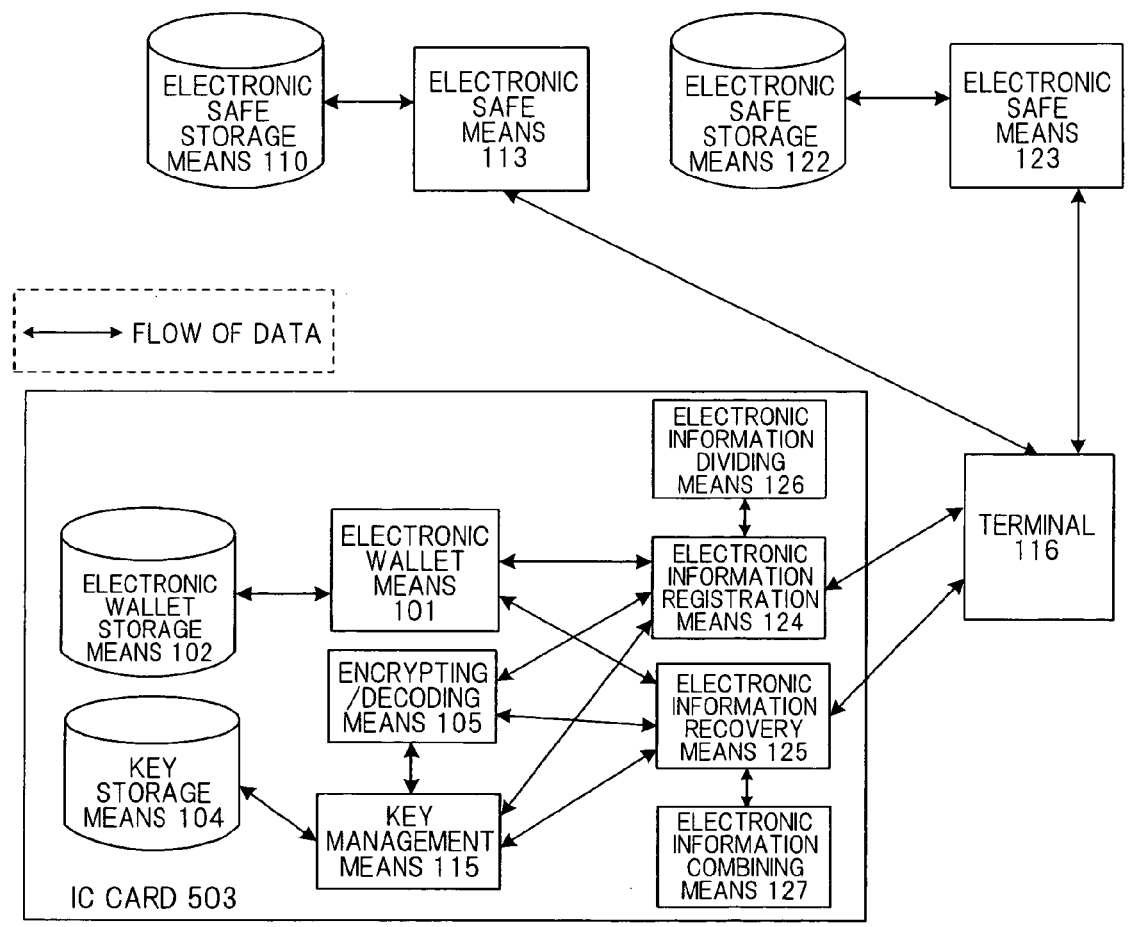
FIG. 11 is a structural diagram of an electronic information backup system in a fourth embodiment of the present invention.

Next, the fourth embodiment in relation to seventh, eighth, ninth aspects of the present invention will be explained with reference to FIG. 11. FIG. 11 is a structural diagram illustrating an example the electronic information backup system in the fourth embodiment. This system replaces the terminal 114 of the system of the third embodiment (FIG. 10) with the terminal 114 and also replaces the IC card 502 with the IC card 503. The IC card 503 is formed by adding, to the IC card 502, an electronic information dividing means 126 and an electronic information combining means 127, modifies the electronic information registration means 120 to the electronic information registration means 124 and the electronic information recovery means 121 to the electronic information recovery means 125. The electronic information dividing means 126 and electronic information combining means 127 are formed of a software, a storage area for storing this software, an OS for interpreting and executing this software and a CPU.

Operations of the fourth embodiment will be explained. In this case, only the part different from the second and third embodiments will be explained because the basic operations thereof are similar to that of the second and third embodiments. The electronic information dividing means 126 divides the electronic value information to the desired number of partial electronic information pieces to which the identifiers to recover the electronic value information to the original electronic value information. The electronic information combining means 127 recovers the original electronic value information from such all divided electronic information pieces. The electronic information registration means 124 acquires a plurality of partial electronic information pieces by requesting a division of the electronic value information to the electronic information dividing means 126 and also acquires the same number of partial information registration certificates by registering all partial electronic information pieces to the electronic safe means 113. The electronic information recovery means 125 acquires the same number of partial electronic information pieces by presenting all acquired partial information registration certificates to the electronic safe means 113 corresponding to respective partial information registration certificates and the electronic information combining means 127 recovers the electronic value information on the electronic wallet means 101 from all acquired partial electronic information pieces.

In the fourth embodiment, the electronic information registration means 124 acquires the encryption-divided electronic information by encrypting the division electronic information to be registered using the encrypting/decoding means 105 and also acquires the corresponding registration certificate by registering the acquired encryption-divided electronic information to the electronic safe means 113, but, on the contrary, it is also possible that the encryption-divided electronic information is acquired by encrypting the electronic value information using the encrypting/decoding means 105, the division-encrypted electronic information is acquired from the acquired encryption-divided electronic information using the electronic information dividing means 126 and the corresponding registration certificate is acquired by registering the division-encrypted electronic information to the electronic safe means 113. Moreover, as explained in the third embodiment, it is also possible to backup the encryption-divided electronic information for the electronic safe means 113 and backup the decoding key for the electronic safe means 123.

Fifth Embodiment

Figure 12:
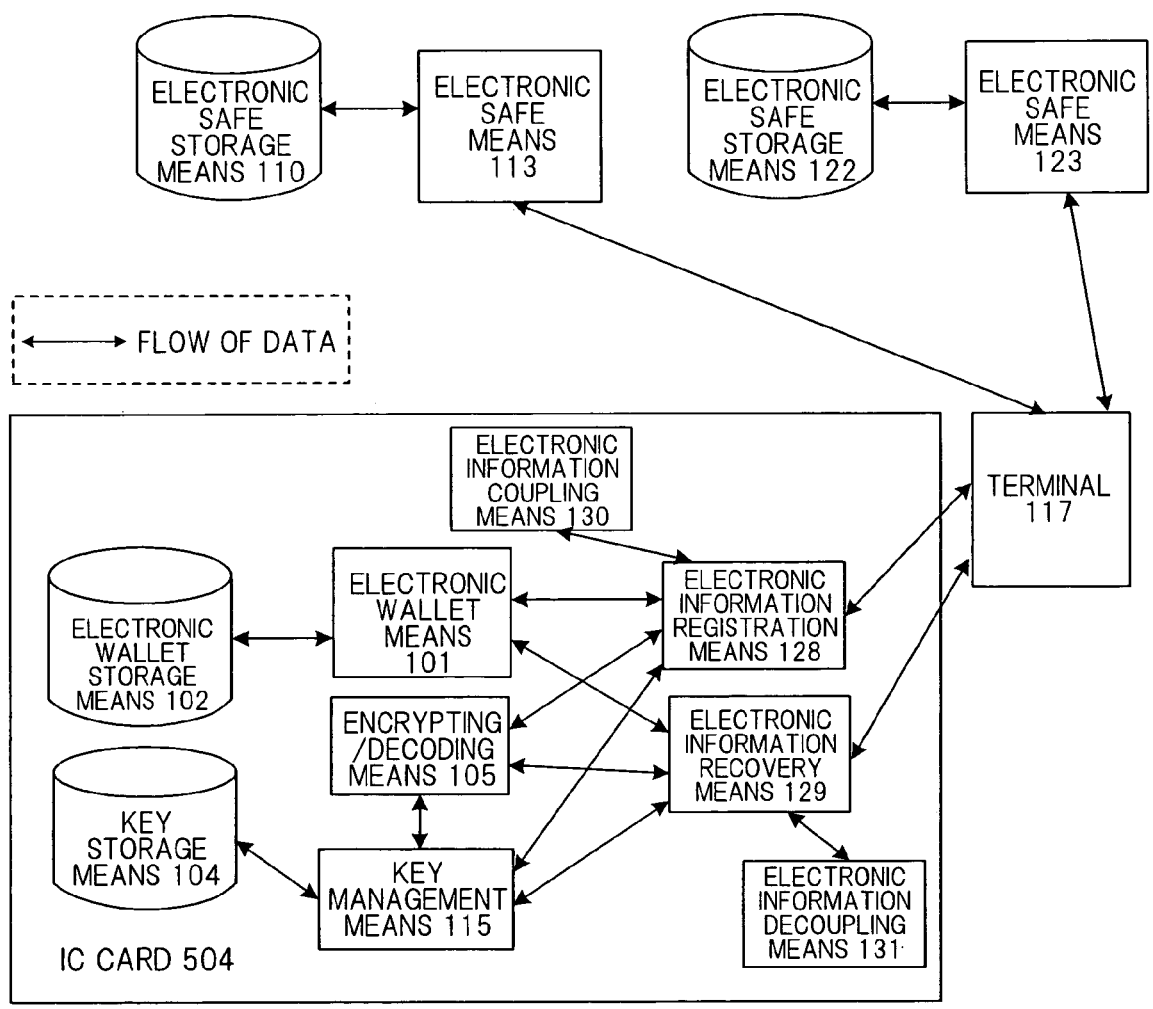
FIG. 12 is a structural diagram of an electronic information backup system in a fifth embodiment of the present invention.

Next, the fifth embodiment in relation to a tenth aspect of the present invention will be explained with reference to FIG. 12. FIG. 12 is a structural diagram illustrating an example of the electronic information backup system of the fifth embodiment. This system replaces the terminal 114 of the system of the third embodiment (FIG. 10) with the terminal 117 and also the IC card 502 with the IC card 504. The IC card 504 adds, to the IC card 502, an electronic information coupling means 130 and an electronic information decoupling means 131, modifies the electronic information registration means 120 to an electronic information registration means 128 and also the electronic information recovery means 121 to an electronic information recovery means 129. The electronic information coupling means 130 couples a plurality of electronic value information pieces and outputs one coupled electronic information. The electronic information decoupling means 131 decouples the coupled electronic information to a plurality of original electronic information pieces. The electronic information coupling means 130 and electronic information decoupling means 131 are formed of a software, a storage area for storing this software, an OS for interpreting and executing this software and a CPU.

Operations of this fifth embodiment will be explained below. In this case, only the part different from the third embodiment will be explained because the basic operations are identical to that of the third embodiment. The electronic information coupling means 130 generates one coupled electronic information from a set of a plurality of electronic value information pieces, the electronic information registration means 128 registers this coupled electronic information to the electronic safe means 113 and acquires the corresponding coupled electronic information registration certificate, the electronic information recovery means 129 presents this coupled electronic information registration certificate and acquires the corresponding coupled electronic information from the electronic safe means 113 and the electronic information decoupling means 131 generates a set of a plurality of original electronic value information pieces from the coupled electronic information and then recovers it on the electronic wallet means 101.

In the fifth embodiment, the electronic information registration means 128 acquires the coupling-encrypted electronic information by encrypting the coupling electronic information to be registered using the encrypting/decoding means 105 and also acquires the corresponding registration certificate by registering the acquired coupling-encrypted electronic information to the electronic safe means 113. However, it is also possible to acquire, on the contrary, the encryption electronic information by encrypting a plurality of electronic value information pieces using the encrypting/decoding means 105 and then obtain the corresponding registration certificate by registering the coupling-encrypted electronic information to the electronic safe means 113 using the electronic information coupling means 130 from the acquired encryption electronic information. Moreover, as in the case of the third embodiment, the coupling-encrypted electronic information is backed up for the electronic safe means 113, while the decoding key is backed up for the electronic safe means 123.

Sixth Embodiment

Figure 13:
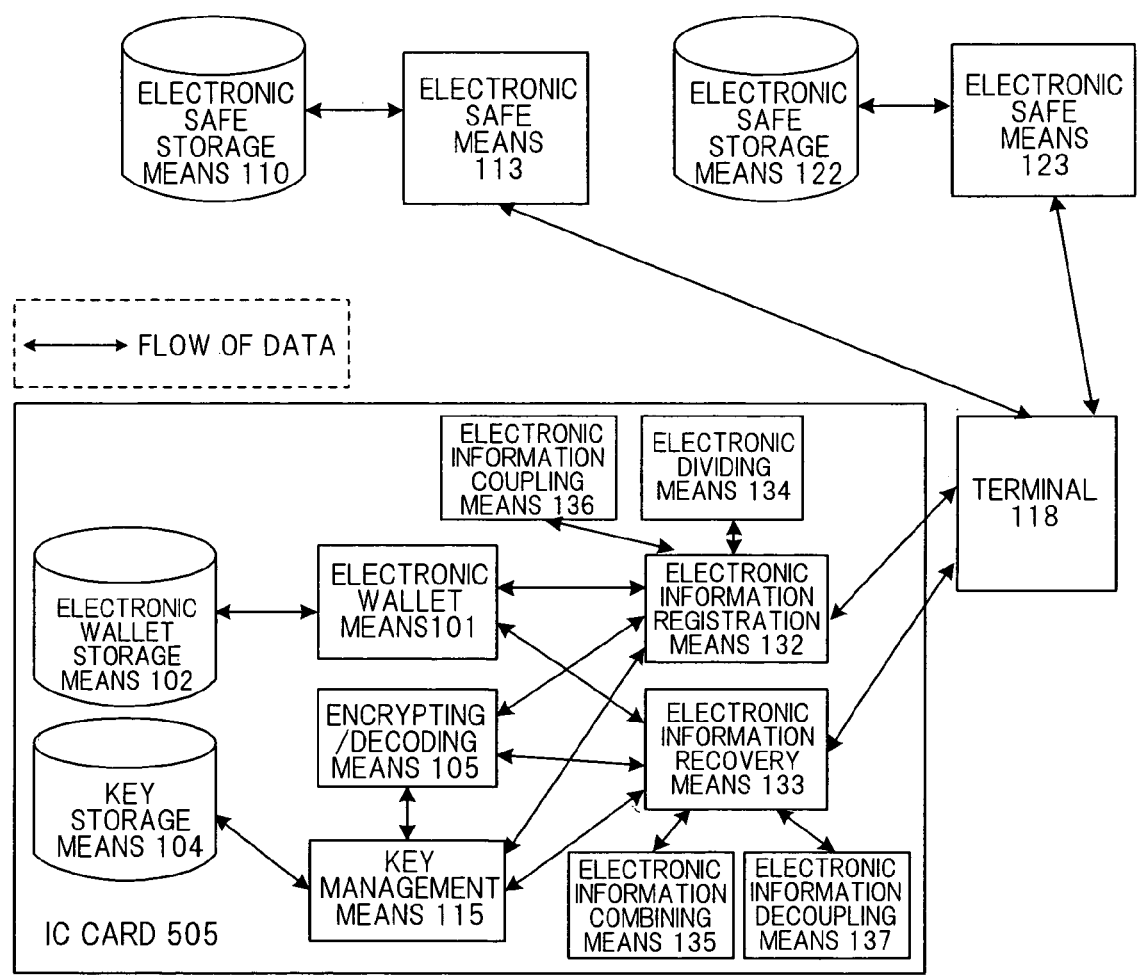
FIG. 13 is a structural diagram of an electronic information backup system in a sixth embodiment of the present invention.

Next, the sixth embodiment in relation to eleventh and twentieth aspects of the present invention will be explained with reference to FIG. 13. FIG. 13 is a structural diagram illustrating an example of the electronic information backup system of the sixth embodiment. This system combines the fourth embodiment (FIG. 11) and fifth embodiment (FIG. 12) and uses the new terminal 118 and IC card 505. The IC card 505 comprises the electronic information registration means 132 and electronic information recovery means 133, electronic dividing means 134 and electronic combining means 135, electronic information coupling means 136 and electronic information decoupling means 137. The other part is identical to the fourth and fifth embodiments.

Operations of the sixth embodiment will be explained below, but differences of this sixth embodiment from the fourth and sixth embodiments are that the decoding key is divided to a couple of partial keys, one partial key is registered to one electronic safe means 113 by forming a set with the electronic value information and the other partial key is registered to the other electronic safe means 123. The electronic information dividing means 134 divides, into a plurality of partial keys, the decoding key information that is acquired by the electronic information registration means 132 from the key storage means 104 via the key management means 105. The encrypting/decoding means 105 encrypts the electronic value information acquired by the electronic information registration means 132 from the electronic wallet means 101 to obtain the encryption electronic information. The electronic information coupling means 136 couples such encryption electronic information and the partial key group A as a part of the divided partial key to output the coupled electronic information. The electronic information registration means 132 obtains the corresponding registration certificates by respectively registering the coupled electronic information to the electronic safe mans 113 and the partial key group B as the remaining partial key to the different electronic safe means 123. The electronic information recovery means 133 presents these registration certificates to the corresponding electronic safe means 113 and 123 and acquires the coupled electronic information and partial key group B. The electronic information decoupling means 137 decouples the coupled electronic information into the encryption electronic information and the partial key group A, the electronic information combining means 135 generates the decoding key by combining the partial key group A and partial key group B, the encrypting/decoding means 105 outputs the electronic value information by decoding the encryption electronic information and the electronic information recovery means 133 recovers the key information on the key storage means 104 via the key management means 115 and also recovers the electronic value information on the electronic wallet means 101.

In above explanation, the electronic value information is divided into the two partial information pieces but it may also be divided to three or more partial information pieces. Moreover, it is also possible to deposit the divided electronic value information pieces to only one electronic safe means. In addition, it is not always required to deposit all divided electronic value information pieces and only the required ones may be deposited. Further, it is of course possible that the electronic value information itself is divided into a plurality of information pieces, as illustrated in FIG. 4, one divided electronic information is combined with one divided key information and is then registered to one electronic safe means 113 and the other divided electronic information is combined with the other divided key information and is then registered to the other electronic safe means 123. In addition, like the fifth embodiment, the electronic value information combining a plurality of electronic value information pieces may be used as the electronic value information.

With use of the system explained above, since the encrypted electronic value information cannot be decoded only by acquiring a part of the decoding key, the key information and moreover electronic value information can be safely backed up by encryption and backup of the electronic value information of a user using a secret key for the electronic safe means, locally detecting the summary of the backed-up electronic value information, recovering, from the electronic safe means, the electronic value information backed up as required through the encryption and by backing up one divided key to one electronic safe server together with the electronic value information through the division of the decoding key and then backing up the other divided key to the other electronic safe server.

Seventh Embodiment

Figure 14:
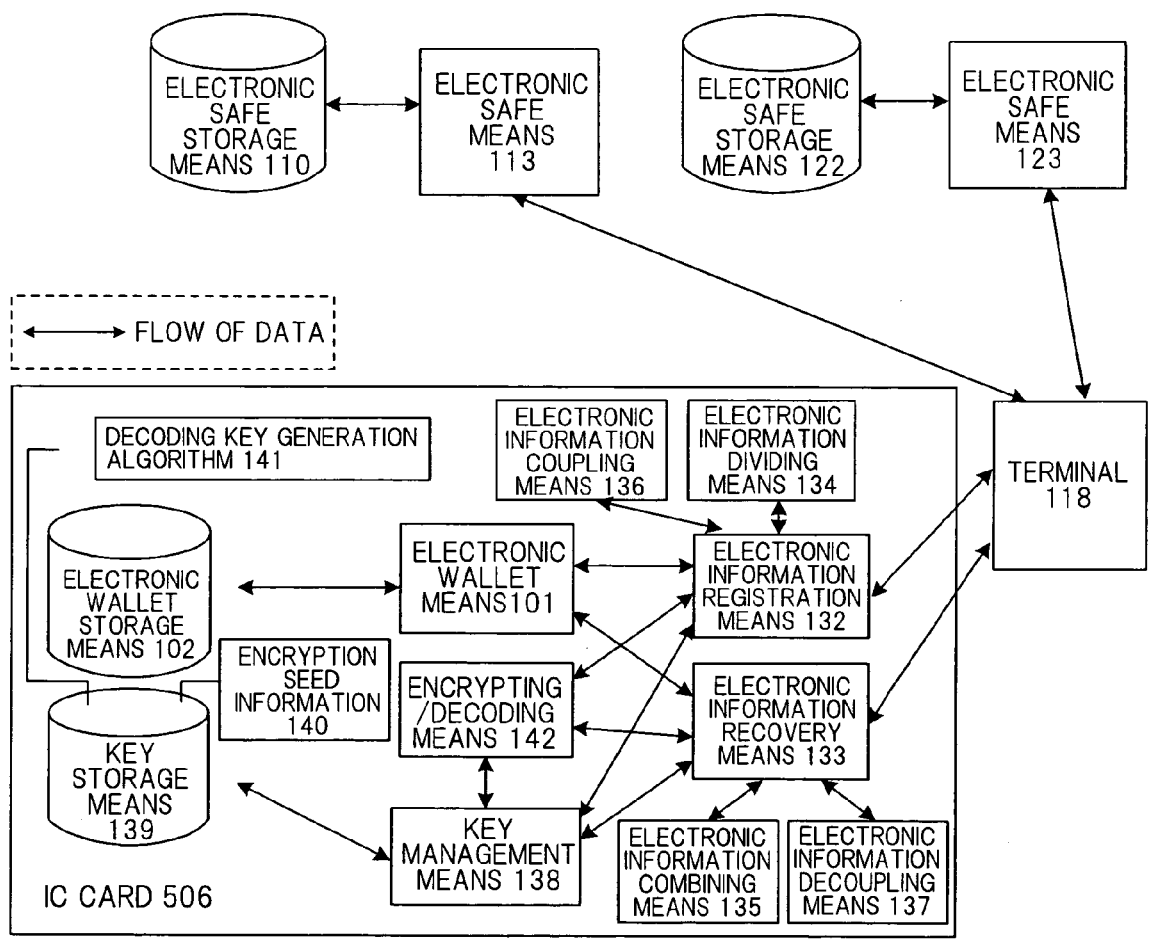
FIG. 14 is a structural diagram of an electronic information backup system in a seventh embodiment.

Next, the seventh embodiment in relation to a thirteenth aspect of the present invention will be explained with reference to FIG. 14. FIG. 14 is a structural diagram illustrating an example of the electronic information backup system of the seventh embodiment. This system replaces the IC card 505 of the seventh embodiment (FIG. 13) with the IC card 506. The IC card 506 holds, for the IC card 505, the original encryption seed information 140 that is used by the key storage means 139 to mathematically generate the decoding key and the decoding key generation algorithm 141 to generate the decoding key from this encryption seed information. The encrypting/decoding means 142 generates the decoding key by multiplying the encryption seed information 140 with the decoding key generation algorithm 141. The encryption seed information 140 and decoding key generation algorithm 141 may be held from the beginning to the key storage means 139 or any one may be held and the other may be down-loaded later from the outside, or both may also be down-loaded from the outside. As the encryption seed information, the prime number or other known information may be used and this information may also be replaced not only with the decoding key but also with the information that is the source information to mathematically generate a pair of the encryption key and decoding key.

Operations of the seventh embodiment will be explained but since the basic operations are identical to that of the first to sixth embodiments, only different part from these embodiments will be explained below.

(1-1)
The terminal 118 requests acquisition of the decoding key to the encrypting/decoding means 142.

(1-2)
The encrypting/decoding means 142 refers to the key storage means 139 via the key management means 138 and acquires the encryption seed information 140.

(1-3)
The encrypting/decoding means 142 transfers the encryption seed information 140 to the electronic information registration means 132.

(1-4)
The electronic information registration means 132 requests registration of the encryption seed information 140 to the electronic safe means 123 via the terminal 118.

(1-5)
The electronic safe means 123 stores the encryption seed information 140 to the electronic safe means 123 and notifies end of registration by sending the encryption seed information registration certificate to the terminal 118.

(1-6)
The terminal 118 transfers the encryption seed registration certificate to the electronic information registration means 132.

(1-7)
The key management means 138 transfers the encryption seed registration certificate to the key storage means 139 and deletes the encryption seed information 140 from the key storage means 139.

(2-1)
The terminal 118 requests the electronic value information list to the electronic wallet means 101. The electronic wallet means 101 generates the electronic value information list and sends it to the terminal 118.

(2-2)
The terminal 118 requests presentation of the electronic value information selected from the electronic value information list to the electronic wallet means 101. The electronic wallet means 101 acquires the electronic value information from the electronic wallet storage means 102. The encrypting/decoding means 142 generates the encryption electronic value information from the electronic value information and sends this information to the electronic wallet means 101. The electronic wallet means 101 sends the encryption electronic value information to the terminal 118 via the electronic registration mans 132.

(2-3)
The terminal 118 requests registration of the encryption electronic value information to the electronic safe means 113. The electronic safe means 113 stores the encryption electronic value information to the electronic safe storage means 110, generates the electronic information registration certificate and sends the registration certificate to the terminal 118.

(2-4)
The terminal 118 requests storage of the electronic information registration certificate to the electronic wallet means 101 via the electronic information registration means 132. The electronic wallet means 101 stores the electronic information registration certificate to the electronic wallet storage means 102 and sends the end message to the terminal 118.

(3-1)

The terminal 118 requests the decoding key to the encrypting/decoding means 142 via the electronic information recovery means 133.

(3-2)

The key management means 138 extracts the encryption seed information registration certificate from the key storage means 139 and transfers the certificate to the encrypting/decoding means 142.

(3-3)

The encrypting/decoding means 142 transfers the encryption seed information registration certificate to the electronic information recovery means 133 and the terminal 118 presents the encryption seed information registration certificate to the electronic safe means 123 via the electronic information recovery means 133 to request returning of the encryption seed information.

(3-4)

The electronic safe means 123 extracts the relevant encryption seed information from the encryption seed information registration certificate from the electronic safe storage mans 122 and transfers it to the terminal 118.

(3-5)

The encrypting/decoding means 142 receives the decoding key generation algorithm 141 from the key storage means 139 via the key management means 138 and generates the decoding key by multiplying the decoding key generation algorithm 141 with the encryption seed information received via the electronic information recovery means 133.

(3-6)

The encrypting/decoding means 142 stores the recovered decoding key to the key management means 139 via the key management means 138.

(3-7)

The encrypting/decoding means 142 notifies, to the terminal 118, that the recovery of the decoding key is completed.

In the seventh embodiment, the electronic value information is registered to the electronic safe means 113 and the encryption seed information is registered to the electronic safe means 123, but it is also possible that both are registered to only one electronic safe means to receive the respective registration certificates. Moreover, it is also possible like the sixth embodiment that the encryption seed information is divided to two information pieces with the electronic dividing means 134, one is combined with the electronic value information with the electronic coupling means 136 and are then registered to the electronic safe means 113, the other divided seed information is registered to the other electronic safe means 123, the electronic value information received from the electronic safe mean 113 is divided, at the time of recovery, to the electronic value information and one seed information with the electronic decoupling means 137 and the divided seed information and the other seed information received from the electronic safe means 123 are coupled with the electronic information coupling means 135 into only one seed information.

With use of the system explained above, since the information recovery is impossible only with acquisition of the encryption seed information, the key information and moreover the electronic value information can be backed up very safely by backing up the electronic value information of the user through the encryption using a secret key for the electronic safe means, locally detecting the summary of the backed-up electronic value information, recovering, from the electronic safe means, the electronic value information that is backed up through the encryption as required and backing up the original encryption seed information in place of backing up the decoding key itself to decode the encryption.

Eighth Embodiment

Figure 15:
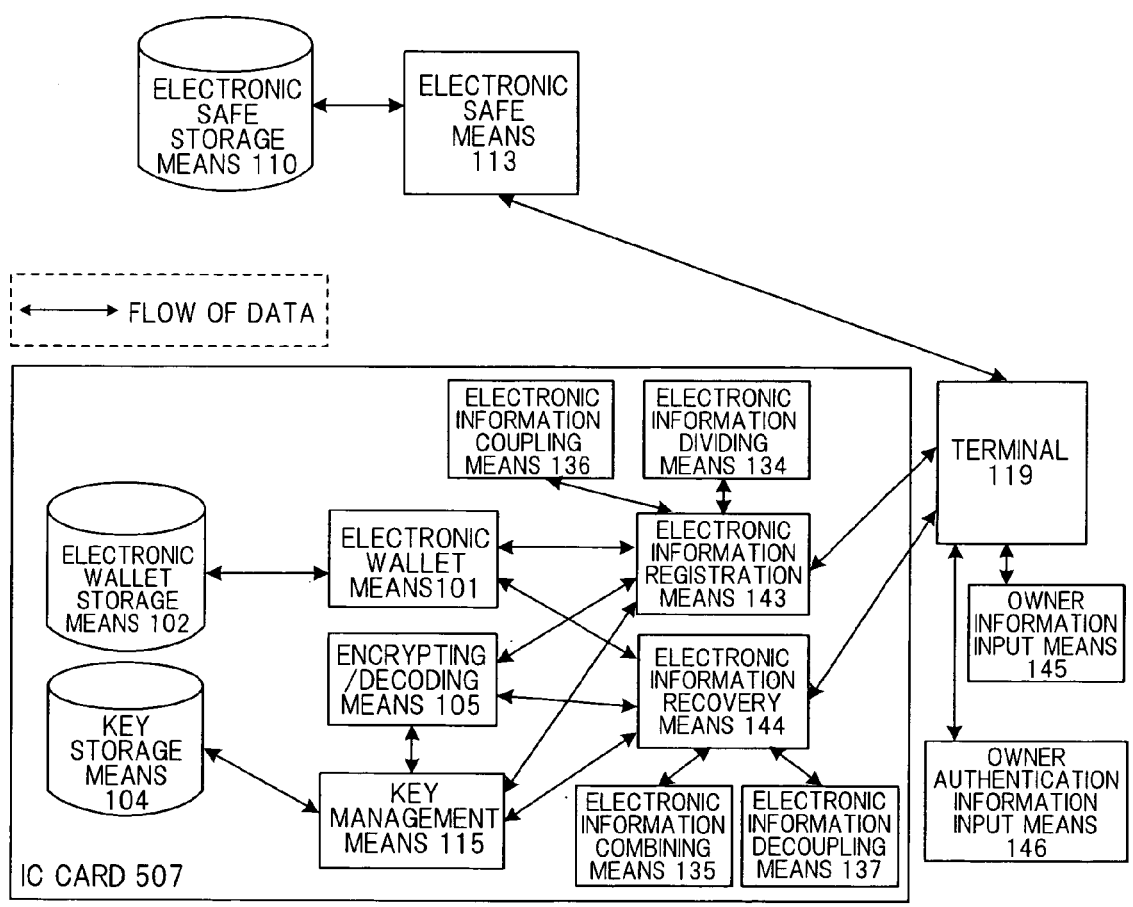
FIG. 15 is a structural diagram of an electronic information backup system in an eighth embodiment of the present invention.

Next, the eighth embodiment in relation to a fourteenth aspect of the present invention will be explained with reference to FIG. 15. FIG. 15 is a structural diagram illustrating an example of the electronic information backup system of the eighth embodiment. This system replaces the terminal 118 of the system of the sixth embodiment (FIG. 13) with the terminal 119 and replaces the IC card 505 with the IC card 507. The IC card 507 modifies the electronic information registration means 132 to the electronic information registration means 143 for the IC card 505 and also modifies the electronic information recovery means 133 to the electronic information recovery means 144. The terminal 119 is connected with an owner information input means 145 and an owner authentication information input means 146.

Operations of this eighth embodiment are explained below but since the basic operations are identical to that of the first embodiment to sixth embodiment, only the part different from these embodiments will be explained. The terminal 119 allows input of the intrinsic owner information from the owner information input means 145 and also allows input of the owner authentication information corresponding to the owner information from the owner authentication information input means 146. The electronic information registration means 143 registers a set of the electronic value information and the owner authentication information acquired from the owner authentication information input means 146. The electronic information recovery means 144 presents the owner information acquired from the owner information input means 145 to the electronic safe means 113 and obtains the electronic value information when collation with the owner authentication information is completed successfully. The owner information and owner authentication information may simply be compared using the same information or the value calculated with the unidirection function from the owner information may be used as the owner authentication information. Moreover, a password may also be used as the owner information and a finger print or a palm print and a living body information such as iris may also be used.

With use of the system explained above, the authentication can be realized with a safe method by backing up through the encryption the electronic value information of a user using a secret key for the electronic safe means, locally detecting the summary of the backed-up electronic value information, recovering, from the electronic safe means, the electronic value information backed up through encryption as required, and decoding the electronic value information encrypted through recovery on the key storage means when the authentication is successful even if the decoding key for decoding the encryption is lost.

Ninth Embodiment

Figure 16:
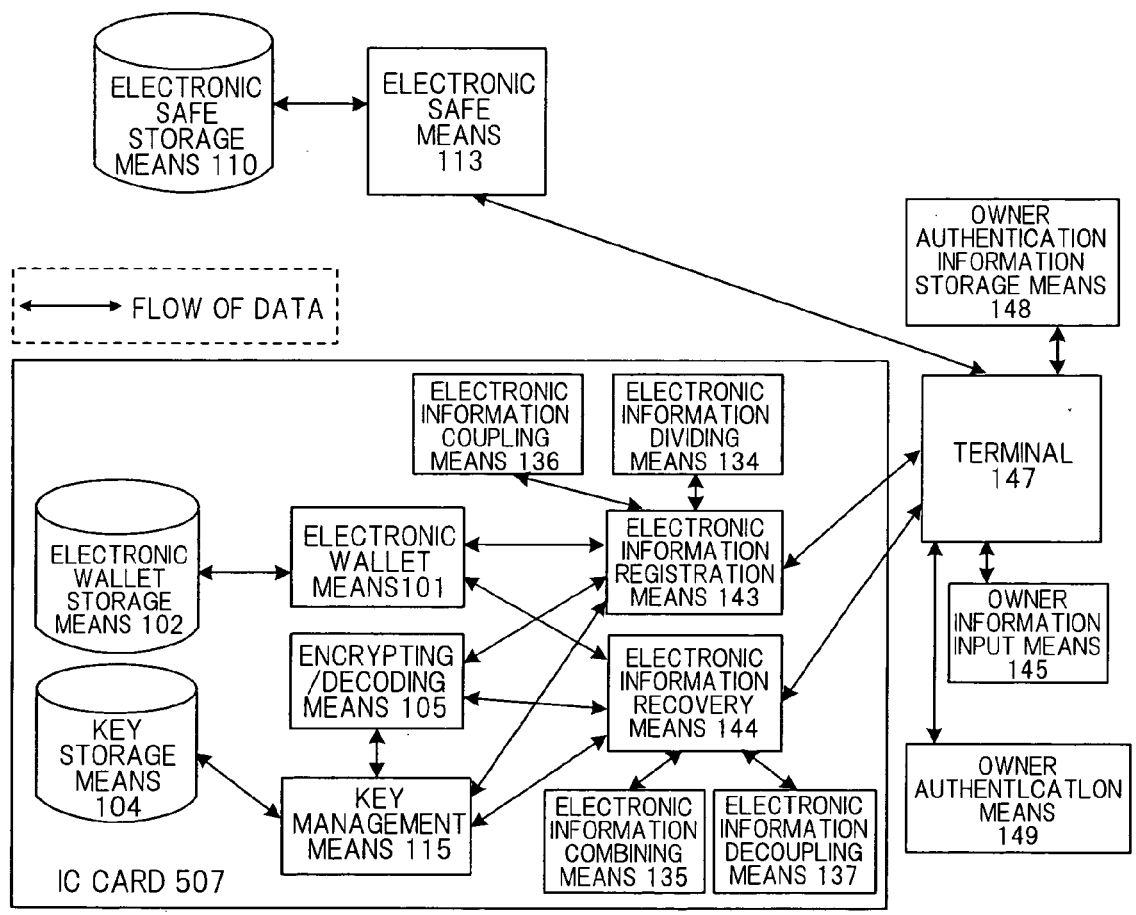
FIG. 16 is a structural diagram of an electronic information backup system in a ninth embodiment of the present invention.

Next, the ninth embodiment in relation to fifteenth, sixteenth, seventeenth aspects of the present invention will be explained with reference to FIG. 16. FIG. 16 is a structural diagram illustrating an example of the electronic information backup system of this ninth embodiment of FIG. 16. This system replaces the terminal 119 of the system of the eighth embodiment (FIG. 15) with the terminal 147 and this terminal 147 is connected with an owner information input means 145, an owner authentication information storage means 148 and an owner authentication means 149.

Operations of the ninth embodiment will be explained below, but since the basic operation is similar to that of the first embodiment to sixth embodiment, only the part different from these embodiments will be explained. The terminal 147 allows input of the intrinsic owner information from the owner information input mans 145. The owner authentication information storage means 148 holds the owner authentication information corresponding to the input owner information. The owner authentication means 149 inspects legitimacy by collating the input owner information and stored owner authentication information. When the owner is authenticated as the legitimate owner as a result of inspection, the terminal 147 notifies it to the electronic safe means 113 and this electronic safe means 113 establishes the encryption communication path between the electronic information registration means 143 and electronic safe means 113. The electronic information registration means 143 registers the electronic value information to the electronic safe means 113 via this encryption communication path and the electronic safe means 113 holds a set of the owner authentication information corresponding to the result of authentication and the electronic value information to the electronic safe storage means 110. Thereby, the electronic information recovery means 144 can acquire the electronic value information corresponding to the owner authentication information based on the result of authentication via the above encryption communication path.

Here, it is also possible that a common key that is used temporarily with the owner information input means 145 and owner authentication means 149 is generated and used in common and the owner information is encrypted using this common key and it is then transmitted to the owner authentication means 149. Moreover, it is also possible that the owner information input means 145 encrypts the owner information with a public key corresponding to the intrinsic secret key of the owner authentication means 149 and then transmits the encrypted owner information to the owner authentication means 149.

Moreover, the owner information and owner authentication information can simply be compared using the same information and the value obtained by calculating the owner information with the unidirectional function may be used as the owner authentication information. In addition, as the owner information, a password can be used and a finger print, a palm print and a living information such as iris can also be used.

Tenth Embodiment

Figure 17:
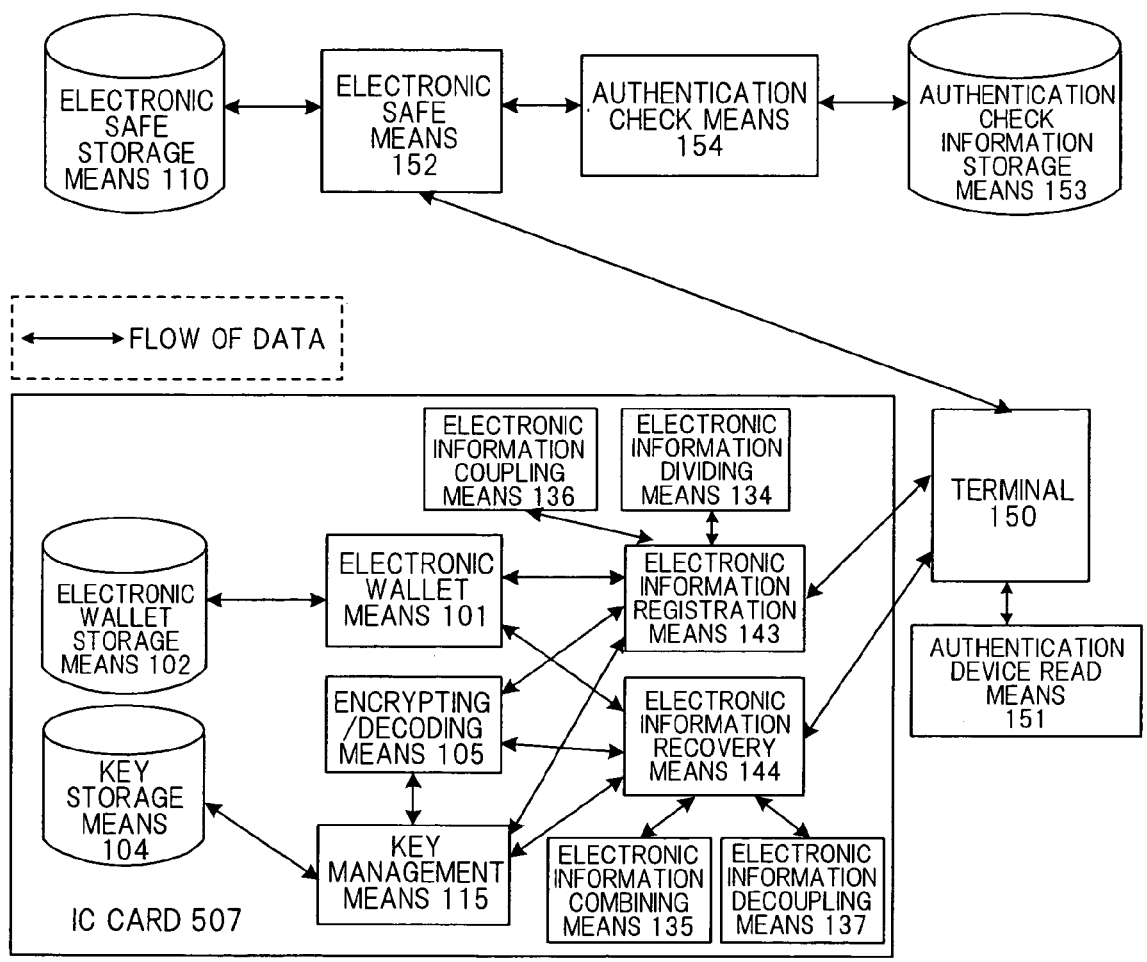
FIG. 17 is a structural diagram of an electronic information backup system in a tenth embodiment of the present invention.

Next, the tenth embodiment in relation to eighteenth and ninetieth aspects of the present invention will be explained with reference to FIG. 17. FIG. 17 is a structural diagram illustrating an example of the electronic information backup system of the tenth embodiment. This system replaces the terminal 119 of the system of the eighth embodiment (FIG. 15) with the terminal 150 and connects an authentication device read means 151 to this terminal 150 and also replaces the electronic safe means 113 with the electronic safe means 152. The authentication device read means 151 is an IC card reader to read the IC card as the authentication device.

Moreover, the electronic safe means 152 is connected with an authentication check means 154 for inspecting legitimacy of the IC card as the authentication device based on the information from the authentication check information storage means 153.

Operations of this tenth embodiment will be explained below but since the basic operations are identical to those of the first embodiment to the sixth embodiment, only the part different from these embodiments will be explained. To the terminal 150, the ID information of the IC card as the authentication card read by the authentication device read means 151 is inputted. The terminal 150 sends this ID information to the electronic safe means 152. The electronic safe means 152 sends this ID information to the authentication check means 154 and this authentication check means 154 reads the corresponding ID information from the authentication check information storage means 153 and verifies legitimacy through the collation. When the owner is authenticated as the legitimate owner as a result of verification, the electronic safe means 152 sends this information to the terminal 150 to form the encryption communication path between the electronic information registration means 143 and electronic safe means 152 and the electronic information registration means 143 registers the electronic value information to the electronic safe means 152 to this encryption communication path. The electronic safe means 152 holds a set of the owner authentication information corresponding to the authentication result and the electronic value information to the electronic safe storage means 110. Thereby, the electronic information recovery means 144 can acquire the electronic value information corresponding to the owner authentication information based on the authentication result via the encryption communication path.

In the tenth embodiment, an IC card is used as t the authentication device and an IC card reader is used as the authentication device read means, but it is also possible to use the memory card having the security function and memory card reader.

Eleventh Embodiment

Figure 18:
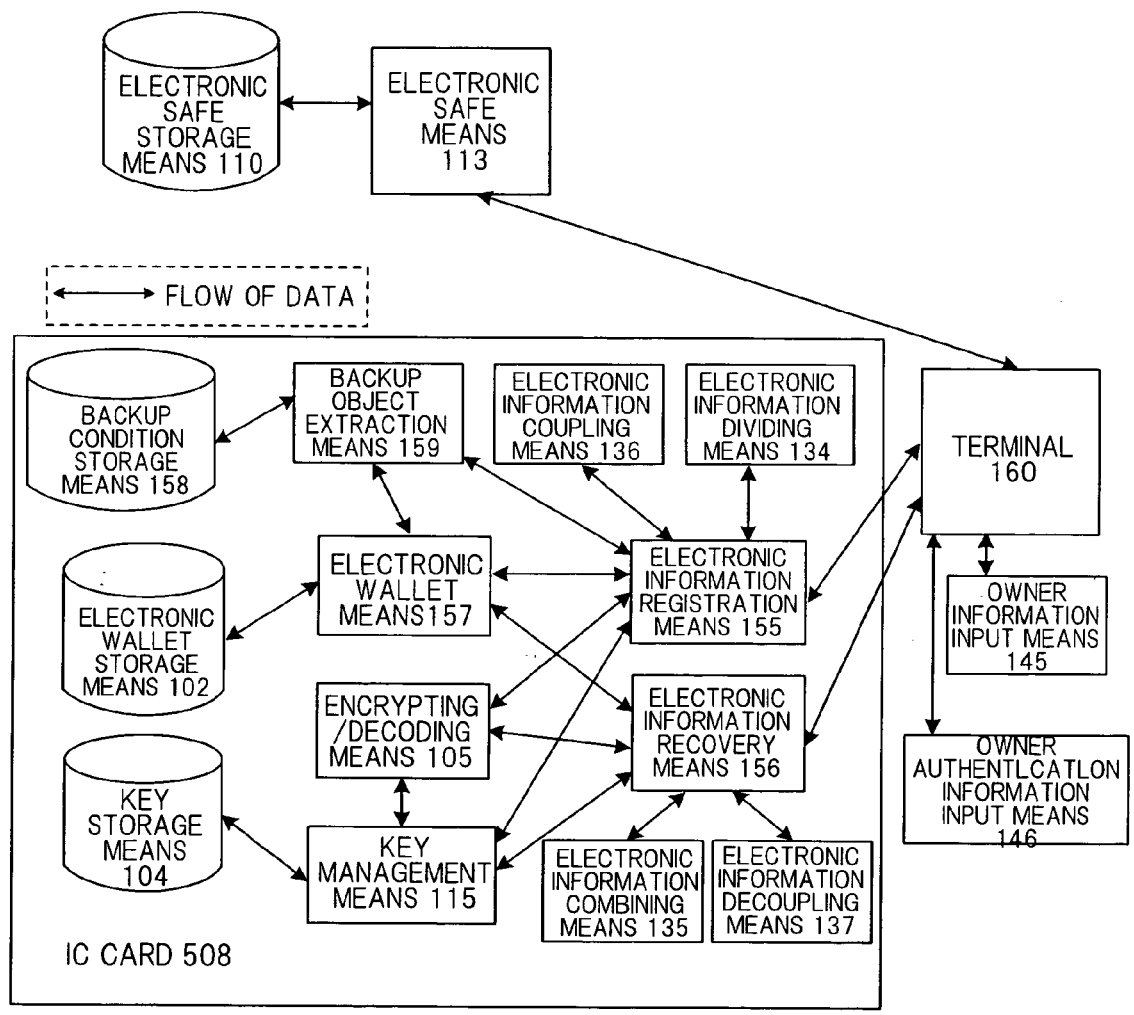
FIG. 18 is a structural diagram of an electronic information backup system in an eleventh embodiment of the present invention.

Next, the eleventh embodiment in relation to twentieth and twenty-first aspects of the present invention will be explained with reference to FIG. 18. FIG. 18 is a structural diagram illustrating an example of the electronic information backup system of the eleventh embodiment. This system replaces the terminal 119 of the system of the eighth embodiment (FIG. 15) with the terminal 160, replaces the IC card 507 with the IC card 508, replaces the electronic information registration means 143 with an electronic registration means 155, replaces the electronic information recovery means 144 with an electronic information recovery means 156, replaces the electronic wallet means 101 with an electronic wallet means 157, moreover adds an backup condition storage means 158 for holding the condition information to backup the electronic value information and a backup object extracting means 159 for selecting the backup object from the electronic wallet means 157 by interpreting the backup condition obtained from the backup condition storage means 158 and replaces the terminal 119 with a terminal 150. The electronic information registration means 145 obtains the corresponding registration certificate by automatically registering the electronic value information of the backup object to the electronic safe means 113. Thereby the electronic value information to be backed up can be selected automatically based on the preset condition in place of the manual selection by user.

Operations of the eleventh embodiment will be explained below but since the basic operations are identical to that of the first embodiment to the sixth embodiment, only the part different from these embodiments will be explained. The backup condition storage means 158 holds the backup condition information and determines the electronic value information to be backed up based on such condition information. In this eleventh embodiment, it is assumed that the backup condition information includes the initial setting and allows a user to generate and change the condition information. As the backup condition information, it is possible to use the kind and capacity of the electronic value information, vacant memory capacity of the electronic wallet storage means 102, effective period of the electronic value information and holding start time of electronic value information, etc. and combination of these data. Here, it is also possible to use the information other than that explained above as the backup condition in addition to the items of the information in the electronic value information.

An example of the backup condition information is illustrated in FIG. 19 and FIG. 20. FIG. 19 illustrates an example of an electronic value information group on the electronic wallet storage means 102. Here, when the backup condition is adapted to a movie ticket, FIG. 20(*a*) illustrates the electronic value information group corresponding to the backup condition. FIG. 20(*b*) illustrates the corresponding electronic value information group under such backup condition that the date is defined as Mar. 15, 2000 and there is no available date within a month.

Next, the extraction procedure of the electronic value information with a backup object extraction means 159 based on such backup condition will then be explained.

(2-1)

The backup object extraction means 159 requests the electronic value information list to the electronic wallet means 157.

(2-2)

The electronic wallet means 157 refers to the electronic wallet storage means 102 to form the electronic value information list.

(2-3)

The electronic wallet means 157 returns the electronic value information list to the backup object extraction means 159.

(2-4)

The backup object extraction means 159 collates the registered backup condition with the list and generates the backup object electronic value information list.

(2-5)

The backup object extraction means 159 transfers the backup object electronic value information list to the electronic wallet means 157.

(2-6)

The electronic wallet means 157 acquires the electronic value information group designated with the backup object electronic value information list from the electronic wallet storage means 102.

(2-7)

The encrypting/decoding means 105 encrypts all electronic value information pieces included in the electronic value information group and generates the encryption electronic value information group.

(2-8)

All encryption electronic value information pieces included in the encryption electronic value information group are backed up to the electronic safe means 113 via the terminal 160 from the electronic information registration means 155.

(2-9)

The electronic safe means 113 transfers the registration group corresponding to the encryption electronic value information group to the electronic wallet means 157 via the electronic information recovery means 156 from the terminal 160.

(2-10)

The electronic wallet mans 157 stores the registration certificate group in the electronic wallet storage means 102 and deletes all electronic value information pieces included in the electronic value information group from the electronic wallet storage means 102.

(2-11)

The electronic wallet storage means 157 notifies the end of process to the terminal 160.

As the timing for starting the backup object extraction means 159, for example, the backup process may be started automatically depending on the procedures indicated in the steps (2-1) to (2-11) by driving the backup object extraction means 149 in every constant period. Otherwise, if the storage capacity of the electronic wallet storage means 102 is shortage when a new electronic value information is registered in the electronic wallet storage means and when the backup electronic value information is recovered, the backup object extraction means 159 can automatically start the backup process depending on the procedure explained above. Otherwise, when the drive is requested by user, the backup object extraction mans 159 can automatically start the backup process depending on the procedure explained above. Otherwise, the backup object extraction means 159 can automatically start the backup process depending on the procedure explained above through the combination of the conditions.

Moreover, when the storage capacity of the electronic wallet storage means 102 is insufficient, it is allowed for a user manipulating the terminal 160 to select, after a user has executed the backup process for the electronic value information stored in the current electronic wallet storage means 102 on the basis of the backup condition information, continuation of registration of a new electronic value information and recovery of the backed-up electronic value information, interruption of registration of a new electronic value information and recovery of backed-up electronic value information and continuation of registration of a new electronic value information and recovery of backed-up electronic value information after execution of the backup process by manual selection of the electronic value information held in the current electronic value storage means 102.

Twelfth Embodiment

Figure 21:
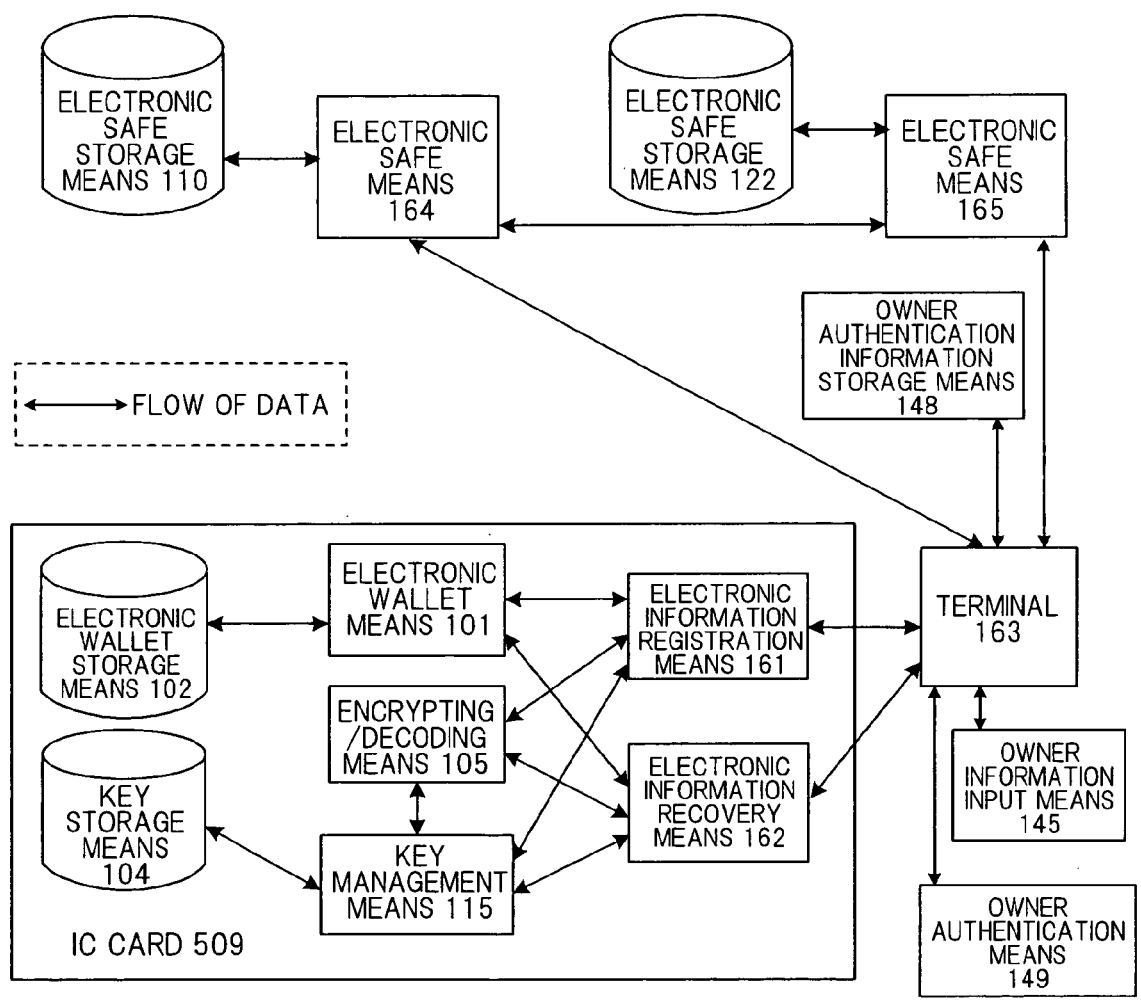
FIG. 21 is a structural diagram of an electronic information backup system in an twelfth embodiment of the present invention.

Next, the twelfth embodiment in relation to twenty-second and twenty-third aspects of the present invention will be explained with reference to FIG. 21. FIG. 21 is a structural diagram illustrating an example of the electronic information backup system of the twelfth embodiment. This system replaces the terminal 114 of the system of the third embodiment (FIG. 10) with a terminal 153, the IC card 502 with an IC card 509, the electronic information registration means 120 with an electronic information registration means 161, the electronic information recovery means 121 with an electronic information recovery means 162 and moreover replaces the electronic safe means 113 with an electronic safe means 164, the electronic safe means 123 with an electronic safe means 165 and connects a couple of electronic safe means 164 and 165 with the communication line. Moreover, the terminal 163 connects the owner information input means 145, owner authentication information storage means 148 and owner authentication means 149 of the ninth embodiment (FIG. 16).

Operations of this twelfth embodiment will be explained below, but since the basic operations are identical to that of the third embodiment and ninth embodiment, only the part different from these embodiments will be explained. When the owner authentication for the other electronic safe means 165 to which the decoding key is registered is completed successful using the owner information input means 145, owner authentication information storage means 148 and owner authentication means 149, this electronic safe means 165 acquires the encryption electronic information through the communication with the electronic safe means 164 to which the electronic value information is registered. The terminal 163 acquires the encryption electronic information from the other electronic safe means 165 and sends this information to the electronic information recovery means 162. The electronic information recovery means 162 decodes the encryption electronic value information to recover this information on the electronic wallet means 101. On the other hand, the encrypting/decoding means 105 generates a pair of a new encryption key and decoding key, encrypts again the electronic value information on the electronic wallet means 101 using this new encryption key. Thereby, the electronic information registration means 161 acquires the registration certificate by sending this new encryption electronic value information to the electronic safe means 164 via the terminal 163 and also acquires the registration certificate by sending a new decoding key to the other electronic safe means 165.

As explained above, when the electronic value information and decoding key are stored in different electronic safe means for keeping security in this twelfth embodiment, if the decoding key is lost and the terminal is destroyed, the electronic value information can be recovered since the electronic safe means made the communication to return a set of the electronic value information and the decoding key to the terminal under the condition that the owner is recognized as the legitimate information owner through the authentication process. Moreover, in the case where the electronic value information is not used immediately, the electronic value information is encrypted using a new encryption key, this encrypted information is sent to one electronic safe means and the decoding key is sent to the other electronic safe means. Thereby, the original condition can be recovered.

In each embodiment explained above, when the electronic information recovery means recovers the corresponding electronic value information on the electronic wallet means by presenting the registration certificate, or when a new electronic value information is registered on the electronic wallet means, if the sufficient capacity for recovery is not left on the electronic wallet storage means, the recovery process can be intermitted by presenting shortage of capacity to user.

Moreover, in each embodiment, when the electronic information registration means acquires the corresponding registration certificate by registering electronic value information obtained from the electronic wallet means to the electronic safe means and the registration certificate is registered normally to the electronic wallet means, the electronic information registration means deletes the electronic value information from the electronic wallet means. Moreover, when the electronic information recovery means acquires the corresponding electronic value information from the electronic-safe means by presenting the registration certificate obtained from the electronic wallet means and successfully recovers the electronic value information on the electronic wallet means, the electronic information recovery means deletes the registration certificate from the electronic wallet means and also deletes the electronic value information from the electronic safe means.

In addition, in each embodiment, highly efficient backup process can be executed by triggering the start of backup process as the reference timing, when the portable terminal is placed on the charger, the portable terminal is not used for the specified period, the battery capacity of portable terminal drops exceeding the predetermined level, or in every predetermined time, for example, 23 o'clock in the midnight wherein the portable terminal is not used, or when the memory capacity of the IC card drops exceeding the predetermined value, or the recovery of the electronic value information after the available period, for example, the electronic value information after one week in future is required.

Moreover, the more effective backup recovery can be realized by triggering the start of recovery from backup process with reference to the timing when the signal receiving condition of the portable terminal is improved, the battery capacity of the portable terminal is recovered exceeding the predetermined level, or in every predetermined time, for example, six o'clock in the morning where the portable terminal can be used, or when the memory capacity of the IC card is recovered exceeding the predetermined value, or the available time limit of the electronic value information, for example, when the electronic value information which is available from the tomorrow is recovered today.

In addition, the read operation with a computer becomes possible by realizing the control program of the electronic wallet means, electronic safe means, electronic information registration means, electronic information recovery means or the like with the software and recording this software to a storage medium such as a magnetic disc, magneto-optical disc, ROM, DVROM or the like.

The invention claimed is:

1. An IC card comprising:
   electronic wallet unit for management of electronic value information;
   electronic wallet storage unit that is the intrinsic storage area of the electronic wallet unit;
   electronic information registration unit registering said electronic value information to an electronic safe unit connected through a network and acquiring a registration certificate from the electronic safe unit;
   electronic information recovery unit for acquiring said electronic value information by presenting said registration certificate to said electronic safe unit;
   electronic information dividing unit for dividing said electronic value information to the desired number of partial electronic information pieces to which an identifier for recovering said electronic value information to the original electronic value information is respectively added; and an electronic information combining unit for recovering said electronic value information from said divided electronic information pieces,
a key storage unit for storing a set of an encryption key for encrypting said electronic value information and a decoding key for decoding the encrypted electronic value information; and
an encrypting/decoding unit for executing the encryption of said electronic value information using the encryption key and also executing the decoding using said decoding key,
wherein said electronic registration unit acquires a plurality of partial electronic information pieces by requesting division of said electronic value information to said electronic information dividing unit and also acquires respective partial information registration certificates by registering the entire part or a part of said partial electronic information to the electronic safe unit,
said electronic information recovery unit acquires respective corresponding partial electronic information pieces by presenting the entire part or a part of said partial information registration certificates to the electronic safe unit that has issued the respective partial information registration certificates, and
said electronic information combining unit recovers said electronic value information from said obtained partial electronic information pieces.

2. The IC card according to claim 1, comprising:
wherein said electronic information registration unit registers the encryption electronic value information obtaining by encrypting the electronic value information obtained from said electronic walled unit with said encrypting/decoding unit to said electronic safe unit in order to obtain the encryption electronic value information registration certificate, and
said electronic information recovery unit obtains the corresponding encryption electronic value information by presenting said encryption electronic value information registration certificate to said electronic safe unit and also obtains said electronic value information decoded with said encrypting/decoding unit and then recovers such information on said electronic safe unit.

3. The IC card according to claim 2, wherein said electronic information registration unit acquires a key registration certificate by obtaining a key information from said key storage unit and registering this information to said electronic safe unit, and
said electronic information recovery unit acquires the corresponding key information by presenting said key registration certificate to said electronic safe unit and then recovering said obtained key information on said key storage unit.

4. The IC card according to claim 2, wherein a decoding key for decoding said encrypted electronic value information is registered to another electronic safe unit different from said electronic safe unit to acquire the key registration certificate and said electronic information recovery unit acquires the corresponding key information by presenting said key registration certificate to said another electronic safe unit and then recovering said obtained key information to said key storage unit.

5. The IC card according to claim 2, wherein said electronic information registration unit acquires a plurality of encryption-divided electronic information by respectively encrypting, with the encrypting/decoding unit a plurality of divided electronic information pieces divided with the electronic information dividing unit and also acquires the corresponding registration certificates by registering, to the electronic safe unit, the entire part or a part of a plurality of obtained encryption-divided electronic information pieces.

6. The IC card according to claim 2, wherein said electronic information registration unit acquires an encryption electronic information by encrypting the electronic value information with said encrypting/decoding unit, also acquires a plurality of division-encrypted electronic information using said electronic information dividing unit from said acquired encryption electronic information and also acquires the corresponding registration certificate by registering the entire part or a part of a plurality of said division-encrypted electronic information pieces to the electronic safe unit.

7. The IC card according to claim 1, comprising:
an electronic information coupling unit for coupling a plurality of electronic value information pieces to output one coupled electronic information; and
an electronic decoupling unit for dividing said coupled electronic information to a plurality of original electronic information pieces,
wherein said electronic information coupling unit generates the coupled electronic information from a set of a plurality of electronic value information pieces,
said electronic information registration unit acquires the corresponding coupled electronic information registration certificate by registering said coupled electronic information to said electronic safe unit,
said electronic information recovery unit acquires the corresponding coupled electronic information from the electronic safe unit by presenting said coupled electronic information registration certificate, and
said electronic information de-coupling unit acquires a set of a plurality of said electronic value information pieces from said coupled electronic information.

8. The IC card according to claim 7, wherein said electronic information dividing unit divides the key information obtained by said electronic information registration unit from said key storage unit into a plurality of partial keys,
said encrypting/decoding unit acquires the encryption of electronic information by encrypting the electronic value information obtained by said electronic information registration unit from said electronic wallet unit,
said electronic information coupling unit acquires the coupled electronic information from said encryption electronic information and the partial key group A as part of said partial key,
said electronic information registration unit acquires the corresponding registration certificate by registering said coupled electronic information and the partial key group B as the remaining partial key to different electronic safe unit respectively,
said electronic information recovery unit acquires said coupled electronic information from said partial key group B by presenting said registration certificate to the corresponding electronic safe unit, said electronic information de-coupling unit isolates said coupled electronic information to said encryption electronic information and said partial group A,
said electronic information combining unit combines said partial key group A and said partial key group A to generate a key information,
said encryption/decoding unit decodes said encryption electronic information and acquires said electronic value information, and
said electronic information recovery unit acquires said key information to recover this information on said key storage unit and also recovers said electronic value information on the electronic wallet unit.

9. The IC card according to claim 8, wherein said electronic information dividing unit sets the partial key obtained by dividing the key information as an original information to generate a pair of keys of the encryption key and the decoding key.

10. The IC card according to claim 2, comprising an original encryption seed information used to generate the decoding key and a decoding key generation algorithm to generate the decoding key from said encryption seed information, wherein said electronic information registering unit acquires the corresponding encryption seed information registration certificate by registering said encryption seed information to said electronic safe unit, said electronic information recovery unit acquires the corresponding encryption seed information from said electronic safe unit by presenting said encryption seed information registration certificate, said encrypting/decoding unit generates the decoding key by multiplying said encryption seed information with said decoding key generation algorithm and said electronic information recovery unit decodes said electronic value information obtained by said electronic information recovery unit using said decoding key.

11. A terminal device connectable with the IC card specified in claim 1, wherein the terminal device receives an intrinsic owner information from an owner information input unit connected with the terminal device, the terminal device receives an owner authentication information corresponding to the owner from an owner authentication information input unit connected with the terminal device, the terminal device sends an owner authentication information to an electronic information registration unit being an element of the IC card, and then the electronic information registration unit can register a set of electronic value information and the owner authentication information to an electronic safe unit connected with a network, the terminal device sends the owner information to an electronic information recovery unit being an element of the IC card, and then the electronic information recovery unit can acquire said electronic value information when collation with said owner authentication information is completed successfully by presenting the owner information obtained from said owner information input unit to said electronic safe unit.

12. The terminal device according to claim 11, wherein the terminal device is connected with an owner authentication information storage unit for holding the owner authentication information corresponding to said owner information and an owner authentication unit for inspecting legitimacy by comparing said owner information with said owner authentication information and, when the terminal device notifies an authentication result obtained by the owner authentication unit to the electronic safe unit, the electronic safe unit forms an encryption communication path between said electronic information registration unit and the electronic safe unit.

13. The terminal device according to claim 12, wherein said owner information input unit and owner authentication unit generate a common key to use temporarily and hold in common, and said owner information input unit encrypts the owner information with said common key to send the encrypted owner information to the owner authentication unit.

14. The terminal device according to claim 12, wherein said owner information input unit encrypts the owner information with the public key corresponding to an intrinsic secret key of the owner authentication unit and said owner information input unit sends the encrypted owner information to the owner authentication unit.

15. The IC card according to claim 1, comprising a backup condition storage unit for storing the condition information for backup of the electronic value information and a backup object extraction unit for selecting the backup object from said electronic wallet unit by interpreting the backup condition obtained from said backup condition storage unit, wherein said electronic information registration unit acquires the corresponding registration certificate by automatically registering said electronic value information of backup object to said electronic safe unit.

16. The IC card according to claim 15, wherein if sufficient capacity is not left on the electronic wallet storage unit when the electronic information recovery unit presents the registration certificate to recover the corresponding electronic value information on the electronic wallet unit or to register a new electronic value information on the electronic wallet unit, the electronic information registration unit acquires the corresponding registration certificate by selecting the electronic value information of the backup object from said electronic wallet unit using said backup object extraction unit and then registering such information to said electronic wallet safe unit, a vacant capacity is expanded by deleting said electronic value information as the backup object from electronic wallet storage unit, and when the sufficient vacant capacity is reserved, the electronic information is recovered on said electronic wallet unit or a new electronic value information is registered.

17. The IC card according to claim 4, wherein when the owner authentication to the another electronic safe unit registering said decoding key is completed successfully, said another electronic safe unit acquires the encryption electronic information through the communication with the electronic safe unit having registered the electronic value information other than said decoding key, and said electronic information recovery unit acquires said encrypted electronic value information from the another electronic safe unit and then recovers such electronic value information on said electronic wallet unit.

18. The IC card according to claim 4, wherein when owner authentication to the another electronic safe unit registering said decoding key is completed successfully, said another electronic safe unit acquires the encryption electronic information by making communication with the electronic safe unit registering the electronic value information other than said decoding key, said electronic information recovery unit acquires said encrypted electronic value information from said another electronic safe unit to recover such information on said electronic wallet unit, said encrypting/decoding unit generates a pair of new encryption key and decoding key, and said electronic value information is encrypted using said new encryption key and said new encryption key is sent to said another electronic safe unit.

19. The IC card according to claim 1, wherein if sufficient capacity for information recovery is not remained on the electronic wallet unit when said electronic information recovery unit presents the registration certificate to recover the corresponding electronic value information on the electronic wallet unit or registers a new electronic value information on the electronic wallet unit, the recovery job is suspended.

20. The IC card according to claim 1, wherein when said electronic information unit acquires the corresponding registration certificate by registering the electronic value information obtained from said electronic wallet unit to said electronic safe unit and said registration certificate is normally registered to said electronic wallet unit, said electronic information registration unit deletes said electronic value information from said electronic wallet unit.

21. The IC card according to claim 1, wherein when said electronic information recovery unit acquires the corresponding electronic value information from said electronic safe unit by presenting the registration certificate obtained from said electronic wallet unit and said electronic value information is normally recovered on the electronic wallet unit, said electronic information recovery unit deletes said registration certificate from said electronic wallet unit and also deletes said electronic value information from said electronic safe unit.

* * * * *